United States Patent
Newberg et al.

(10) Patent No.: US 12,348,502 B2
(45) Date of Patent: Jul. 1, 2025

(54) MULTI-OPTION AUTHENTICATION PORTAL IMPLEMENTATION IN A NETWORK ENVIRONMENT

(71) Applicant: Charter Communications Operating, LLC, St. Louis, MO (US)

(72) Inventors: Shane B. Newberg, Aurora, CO (US); Christopher J. Teague, Castle Pines, CO (US); Venkata R. Divvi, Centennial, CO (US); Cheryl A. Warne, Lone Tree, CO (US); Loay O. Kreishan, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/124,244

(22) Filed: Mar. 21, 2023

(65) Prior Publication Data

US 2023/0231838 A1    Jul. 20, 2023

Related U.S. Application Data

(63) Continuation of application No. 15/813,599, filed on Nov. 15, 2017, now Pat. No. 11,627,121.

(51) Int. Cl.
*H04L 9/40* (2022.01)
*H04W 4/14* (2009.01)
(Continued)

(52) U.S. Cl.
CPC ............ *H04L 63/08* (2013.01); *H04L 63/205* (2013.01); *H04W 4/14* (2013.01); *H04W 12/06* (2013.01); *H04W 12/08* (2013.01)

(58) Field of Classification Search
CPC ........ H04L 63/08; H04L 63/205; H04W 4/14; H04W 12/06; H04W 12/08
See application file for complete search history.

(56) References Cited

U.S. PATENT DOCUMENTS

| 8,484,467 B2 * | 7/2013 | Chan ..................... H04L 63/062 |
| | | 713/168 |
| 2002/0087894 A1* | 7/2002 | Foley .................. H04L 63/0853 |
| | | 726/4 |

(Continued)

FOREIGN PATENT DOCUMENTS

| WO | WO-2006084960 A1 * | 8/2006 | ............. H04L 63/08 |
| WO | WO-2016048129 A2 * | 3/2016 | ............ H04L 63/102 |

*Primary Examiner* — Shewaye Gelagay
*Assistant Examiner* — Carlton Johnson
(74) *Attorney, Agent, or Firm* — Armis IP Law, LLC

(57) ABSTRACT

According to one configuration, a wireless access service provider selects and assigns a particular authentication option amongst multiple different authentication options to an entity such as a wireless access point or a sub-network supported by the wireless access point. When a communication device attempts to use the corresponding wireless access point provided by the wireless access service provider, a wireless access gateway receives information from the wireless access point indicating the particular authentication option assigned to authenticate the communication device. The wireless access gateway communicates the notification of the particular authentication option to an authentication manager, which provides the wireless access gateway with network address information indicating a captive portal in which to authenticate the communication device. The wireless access gateway then uses the network address information to redirect the communication device to the captive portal, which is then used to authenticate the communication device. to access the Internet.

29 Claims, 15 Drawing Sheets

(51) Int. Cl.
*H04W 12/06* (2021.01)
*H04W 12/08* (2021.01)

(56) References Cited

U.S. PATENT DOCUMENTS

2003/0154406 A1\* 8/2003 Honarvar ................. G07C 9/37
   713/153
2013/0174241 A1 7/2013 Cha et al.
2017/0180351 A1\* 6/2017 Lu ........................ H04L 67/146

\* cited by examiner

| WAP IDENTIFIER | NETWORK NAME (SSID) | VENDOR IDENTIFIER | VENDOR'S AUTHN OPTION |
|---|---|---|---|
| 105-1 | HOTEL1 | V1 | AO3 |
| 105-2 | HOTEL1 | V2 | AO2 |
| 105-3 | HOTEL1 | V1 | AO2 |
| ... | ... | ... | ... |

MAPPING INFO. 375

FIG. 3

| WAP IDENTIFIER | NETWORK NAME (SSID) | VENDOR IDENTIFIER | VENDOR'S AUTHN OPTION |
|---|---|---|---|
| 105-1 | HOTEL1-1 | V1 | AO3 |
| 105-1 | HOTEL1-2 | V2 | AO1 |
| 105-1 | HOTEL1-3 | V1 | AO2 |
| 105-2 | HOTEL1-4 | V3 | AO1 |
| 105-2 | HOTEL1-5 | V2 | AO3 |
| 105-2 | HOTEL1-6 | V1 | AO1 |
| 105-3 | HOTEL1-6 | V1 | AO1 |
| 105-3 | HOTEL1-7 | V1 | AO2 |
| ... | ... | ... | ... |

675-1, 675-2, 675-3

MAPPING INFO. 675

FIG. 6

MULTI-OPTION AUTHENTICATION PORTAL IMPLEMENTATION IN A NETWORK ENVIRONMENT

RELATED APPLICATION

This application is a continuation application of earlier filed U.S. patent application Ser. No. 15/813,599 entitled "MULTI-OPTION AUTHENTICATION PORTAL IMPLEMENTATION IN A NETWORK ENVIRONMENT," filed on Nov. 15, 2017, the entire teachings of which are incorporated herein by this reference.

BACKGROUND

Conventional techniques of wireless access authentication can include implementing a captive portal to authenticate new users. In general, a captive portal is a web page that is displayed to newly connected users before they are granted access to network resources such as the Internet.

Typically, to obtain wireless access, a user inputs credentials such as a username, password, etc., to an authentication server serving the captive portal web page. In addition to receiving authentication information such as a password, username, etc., a captive portal (web page) can be used to: receive credit card payment to use wireless services, receive user input indicating acceptance of usage policies, etc., associated with a communication session.

Note that, in certain instances, many customers use portals that don't support authentication; there is only a requirement that the customers agree to terms of service in order to use a wireless network.

Where used, conventional captive portals can be implemented to provide authentication to a broad range of applications such as mobile and pedestrian broadband services-including cable and commercially provided Wi-Fi and home hotspots. In certain instances, a conventional captive portal can be used to provide wireless Internet access to patrons of retail stores, hotels, coffee shops, etc.

BRIEF DESCRIPTION OF EMBODIMENTS

In contrast to conventional techniques that limit a wireless access (point) service provider to use of a single captive portal option for authentication of communication devices to use respective wireless services and a wireless access gateway, embodiments herein provide a novel way of providing flexibility with respect to authentication.

More specifically, in accordance with one embodiment, a wireless access service provider can assign different authentication options (such as via different captive portals provided by one or more different vendors) to authenticate users and/or mobile communication devices under different circumstances.

As an example, assume that a wireless access service provider selects and assigns a particular authentication option (amongst multiple different authentication options) to a corresponding wireless access point or one of its supported wireless sub-networks. When a communication device attempts to use the corresponding wireless access point supported by the wireless access service provider, the corresponding wireless access point notifies the wireless access gateway of the attempted use. As its name suggests, the wireless access gateway controls connectivity of the wireless access point (and corresponding communication device) to a remote network such as the Internet.

In addition to notifying the wireless gateway that the communication device needs to be authenticated, the notification received by the wireless access gateway from the wireless access point can include supplemental data indicating a particular authentication option that is to be used to authenticate the communication device under the given access circumstances.

For example, the notification of the particular authentication option is communicated as supplemental data from the wireless access point to the wireless access gateway. By way of non-limiting example, the supplemental data received from the wireless access point or other suitable resource can include a first data portion and a second data portion. The first data portion (such as first bits of information) indicate which of multiple possible vendors has been pre-chosen by the wireless access service provider to authenticate a communication device attempting to access a remote network such as the Internet; the second data portion (such as second bits of information) indicates which of one or more available authentication options provided by the chosen candidate vendor has been selected by the wireless access service provider to authenticate communication devices using the wireless access point.

Accordingly, an authentication manager resource receiving the supplemental data is able to identify a vendor chosen to provide authentication as well as a particular authentication option provided by the chosen vendor.

In accordance with more specific embodiments, the wireless access gateway communicates notification of the assigned particular authentication option to an authentication management resource.

As a response to receiving the notification of the particular authentication option, the authentication management resource transmits a communication to the wireless access gateway indicating a network address (such as a URL) of a captive portal associated with the particular authentication option to be used for authentication as specified by the supplemental data from the wireless access point. The wireless access gateway uses the network address (or URL) to connect the communication device to the assigned captive portal. The captive portal is then used to authenticate the communication device.

As previously discussed, embodiments herein enable a wireless access service provider to assign different authentication options to different wireless access points, network, locations, etc. Such embodiments are useful because the wireless access service provider can assign a first authentication type (such as a first captive portal option) to authenticate users using a first wireless access point or sub-network; the wireless access service provider can assign a second authentication type (such as a second captive portal option) to authenticate users using a second wireless access point or second sub-network; the wireless access service provider can assign a third authentication type (such as a third captive portal option) to authenticate users using a third wireless access point or third sub-network; and so on. As previously discussed, the wireless access service provider can select amongst multiple vendors to perform authentication depending on the circumstances.

Accordingly, a respective wireless access service provider (providing one or more wireless access points or sub-networks) is not limited to selection and use of a single captive portal vendor or single captive portal type to use a wireless access gateway to access the Internet. Instead, the wireless access service provider can select different authentication options from different vendors and assign the different authentication options that are to be used to support authentication under different circumstances, even though the same wireless access gateway provides corresponding wireless Internet access.

These and other more specific additional embodiments are disclosed herein as further discussed below.

Any of the resources as discussed herein can include one or more computerized devices, mobile communication devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate control of a device. The instructions, when executed by computer processor hardware, cause the computer processor hardware (such as one or more processor devices) to: receive notification of a particular authentication option in which to authenticate a communication device to communicate over a newly established wireless communication link, the particular authentication option being one of multiple available authentication options; communicate the notification of the particular authentication option to an authentication resource; and initiate authentication of the communication device via the particular authentication option.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of managing a network environment of multiple network elements. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

BRIEF DESCRIPTION OF THE DRAWINGS

FIG. 3 is an example diagram illustrating assignment (and mapping) of different authentication options to different wireless access points according to embodiments herein.

FIG. 6 is an example diagram illustrating assignment (and mapping) of different authentication options assigned to different sub-networks of respective wireless access points according to embodiments herein.

Figure 1:
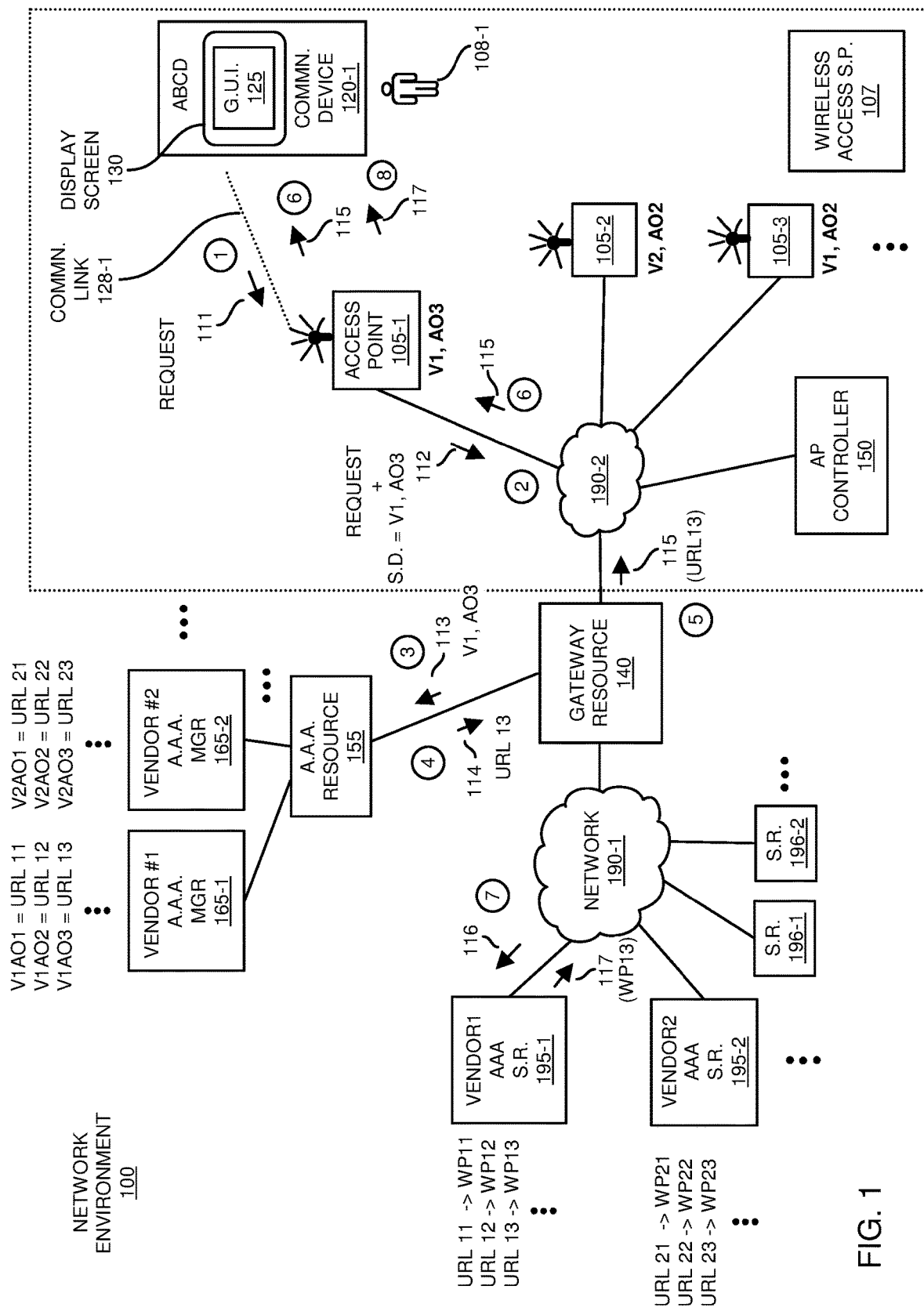
FIG. 1 is an example diagram illustrating a network environment and authentication of a respective communication device in accordance with a first selected authentication option according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

As discussed herein, a wireless access service provider selects and assigns a particular authentication option (amongst multiple different authentication options) to entity or attribute such as a wireless access point, sub-network supported by the wireless access point, location, etc. When a communication device attempts to use a corresponding wireless access point provided by the wireless access service provider (such as to retrieve web content), a wireless access gateway obtains or receives information from the wireless access point indicating the particular authentication option assigned to authenticate the communication device. The wireless access gateway communicates notification of the particular authentication option to an authentication resource. The authentication resource provides the wireless access gateway with network address information (such as an appropriate URL) indicating a captive portal in which to authenticate the communication device. The wireless access gateway uses the network address information (or URL) to connect to the communication device to the captive portal, which then authenticates the communication device for subsequent use of the wireless access point and the wireless access gateway to access a remote network such as the Internet. Thus, prior to receiving the originally requested content, the user of the communication device is forced to views a web page (captive portal) in which to input credentials or other information to perform authentication.

Instead of being limited to implementing a single captive portal to provide authentication in a wireless access service provider's network through a wireless access gateway, embodiments herein enable the wireless access service provider to select amongst multiple different types of captive portals to provide authentication to respective users/communication devices. Different authentication options can be used under different circumstances.

These and additional embodiments are further discussed below.

Now, more specifically, FIG. 1 is an example diagram illustrating a network environment and authentication of respective one or more communication devices according to embodiments herein.

As shown, network environment 100 includes gateway resource 140 (a.k.a. wireless access gateway), network 190-1, and network 190-2.

During operation, communication devices wirelessly connect to wireless access points 105 (including wireless access point 105-1, wireless access point 105-2, wireless access point 105-3, etc.) provided/controlled by wireless access point service provider 107.

As further shown, the gateway resource 140 (a.k.a., wireless access gateway) communicatively couples each of the wireless access points 105 to the network 190-1. In general, gateway resource 140 controls conveyance of communications between wireless access points 105 and network 190-1. As further described herein, communication devices must be authenticated prior to being given access content available from resources (such as server resources 196) in the network 190-1.

In addition to providing selective connectivity of wireless access points 105 and corresponding communication devices to network 190-1, the gateway resource 140 is operable to communicate with the authentication resource 155 to facilitate different types of authentication of users and corresponding communication devices.

In one embodiment, a respective cable network service provider (such as a network service provider entity providing use of gateway resource 140, network 190-2, wireless access points 105, etc., to the wireless access service provider 107) also provides or makes available use of the authentication resource 155 for authentication services. The wireless access service provider 107 controls use of wireless services to one or more communication devices and corresponding one or more users via selection of authentication options to be used under different circumstances.

In this example embodiment, the authentication resource 155 is in further communication with multiple different vendor authentication management resources including vendor #1 authentication manager 165-1, vendor #2 authentication manager 165-2, etc.

Each of the different vendor authentication managers 165 provides the wireless access service provider 107 multiple different options of authenticating one or more communication devices attempting to use the wireless access points 105 to access a remote network 190-1 such as the Internet. For example, vendor #1 provides authentication options V1AO1, V1AO2, V1AO3, etc.; vendor #2 provides authentication options V2AO1, V2AO2, V3AO3, etc.;

Subsequent to proper authentication, a respective communication device is able to communicate through a respective wireless access point and gateway resource 140 to network 190-1 and corresponding server resources 196.

As further shown in this example embodiment, the wireless access service provider 107 chooses different types of authentication for each of the wireless access points 105. For example, assume that the wireless access service provider 107 is a hotel operator. The hotel operator installs the wireless access point 105-1 to support wireless communication with the communication devices in a first geographical location such as hotel guest rooms of a respective hotel owned by the hotel operator. Assume that the operator installs the wireless access point 105-2 to support wireless communication with communication devices and a second geographical location such as a conference room of the hotel. Assume that the operator installs the wireless access point 105-3 to support wireless communication with communication devices in a third geographical location such as a dining room of the hotel.

In accordance with further illustrative embodiments, the wireless access service provider 107 (such as a hotel operator) selects different authentication options for each of the wireless access points 105. As previously discussed, assume that the different authentication options are available for selection from multiple vendors such as vendor V1, vendor V2, etc. Further assume that each vendor supports availability of one or more different captive portals in which to authenticate communication devices.

In this example embodiment, a first captive portal provided by vendor #1 supports a first authentication option (V1AO1) via a first captive portal web page WP11, which is retrievable via network address information such as URL11; a second captive portal provided by vendor #1 supports a second authentication option (V1AO2) via a second captive portal web page WP12, which is retrievable via network address information such as URL12; a third captive portal provided by vendor #1 supports a third authentication option (V1AO3) via a third captive portal web page WP13, which is retrievable via network address information such as URL13, etc.

Assume further that a first captive portal provided by vendor #2 supports a first authentication option (V2AO1) via a first captive portal web page WP21, which is retrievable via network address information such as URL21; assume that a second captive portal provided by vendor #2 supports a second authentication option (V2AO2) via a second captive portal web page WP22, which is retrievable via network address information such as URL22; assume that a third captive portal provided by vendor #2 supports a third authentication option (V2AO3) via a third captive portal web page WP23, which is retrievable via network address information such as URL23, etc.

Accordingly, in one embodiment, each assigned URL (Uniform Resource Locator) such as URL11, URL12, URL13, URL21, URL22, URL23, etc., indicates a respective network address from which to retrieve corresponding webpage information to perform authentication.

Further in this example embodiment, assume that the wireless access service provider 107 (hotel operator) assigns authentication option AO3 provided by vendor #1 to the wireless access point 105-1; assume that the wireless access service provider 107 (hotel operator) assigns authentication option AO2 provided by vendor #2 to the wireless access point 105-2; assume that the wireless access service provider 107 (hotel operator) assigns authentication option AO2 provided by vendor #1 to the wireless access point 105-3; and so on.

By way of non-limiting example, each of the wireless access points 105 stores (or has access to) respective information indicating the assigned authentication option to be used to authenticate corresponding communication devices.

For example, wireless access point 105-1 can be configured to store or have access to setting information indicating that wireless access point 105-2 is assigned authentication option AO3 provided by vendor #1; wireless access point 105-1 can be configured to store or have access to setting information indicating that wireless access point 105-2 is assigned authentication option AO2 provided by vendor #2; wireless access point 105-3 can be configured to store or have access to setting information indicating that wireless access point 105-3 is assigned authentication option AO2 provided by vendor #1; and so on.

When a respective user operates a corresponding communication device to communicate with a respective wireless access point, the corresponding communication device is authenticated in a manner as previously specified by the wireless access service provider 107.

More specifically, assume that the user 108-1 operating the communication device 120-1 wishes to access a remote network such as network 190-1 and server resource 196-1 using wireless services (via one of the wireless access points 105) provided by the wireless access service provider 107. In such an instance, the user 108-1 starts by selecting an SSID (of wireless access point 105-1) to access the remote network 190-1. During establishment of wireless communication link 128-1, the gateway resource 140 can be configured to attempt wireless network MAC (Media Access Control) based authentication. Further in this example embodiment, assume that the user inputs, to a graphical user interface 125 such as a browser, webpage information (such as Google™) indicating a corresponding website to visit or retrieve content such as a web page.

To retrieve the content (Google™ web page) requested by the user 108-1, the communication device 120-1 transmits communication 111 (including the request for content) over the communication link 128-1 to the wireless access point 105-1.

In this particular example, the wireless access point 105-1 detects that it is assigned authentication information V1AO3. In this instance, because the wireless access point 105-1 is assigned authentication option AO3 provided by vendor #1, the wireless access point 105-1 forwards supplemental data (such as an identity of an assigned authentication option V1AO3 or other information) along with the request for Google™ web page in communication 112 to the gateway resource 140.

In one embodiment, the supplemental data from the wireless access point 105-1 or other suitable resource includes a first data portion and a second data portion. The first data portion (such as first bits of information) of communication 112 indicates which of multiple candidate vendors has been chosen by the wireless access service provider 107 to authenticate a communication device 120-1 attempting to access remote network 190-1 such as the Internet. The second data portion of the supplemental data (such as second bits of information) of communication 112 indicates which of one or more available authentication options provided by the chosen candidate vendor has been chosen by the wireless access service provider 107 to authenticate the communication device 120-1 attempting to use the wireless access point 105-1.

Thus, in this example embodiment, the supplemental data in the communication 112 communicated from the wireless access point 105-1 to the gateway resource 140 includes first bits indicating vendor #1 (V1) and second bits indicating authentication option #3 (AO3). In this manner, the gateway resource 140 (wireless access gateway) receiving the supplemental data communication 112 is informed of which of multiple possible available authentication options has been assigned by the wireless access service provider 107 to authenticate the respective communication device 120-1 using the wireless access point 105-1.

Instead of retrieving the originally requested Google™ web page as indicated by communication 112 and immediately conveying the Google™ web page back through network 190-2 and wireless access point 105-1 to the communication device 120-1, the gateway resource 140 detects that it needs to first authenticate the communication device 120-1.

To authenticate the communication device 120-1, the gateway resource 140 communicates with the authentication resource 155. In one embodiment, the gateway resource 140 generates the communication 113 (to the authentication resource 155) to include supplemental data such as first bits indicating vendor #1 (V1) and second bits indicating authentication option #3 (AO3).

In one embodiment, the authentication resource 155 uses the first bits (or supplemental data in general) to identify which of the multiple vendors has been selected to perform authentication. In this example, as previously discussed, the first bits of supplemental data received in communication 113 indicate vendor #1 (V1). Accordingly, the authentication resource 155 knows to communicate an authentication request to vendor #1 authentication manager 165-1.

In one embodiment, the authentication resource 155 (associated with service provider 107) forwards the second bits of the received supplemental data to vendor #1 authentication manager 165-1 as well. The second bits (as previously discussed) notify the vendor #1 authentication manager 165-1 that the authentication option V1AO3 was chosen by the wireless access service provider 107 to authenticate the communication device 120-1 and corresponding user 108-1.

Upon receipt of the authentication request from gateway resource 140 including supplemental data indicating authentication option V1AO3, the vendor #1 authentication manager 165-1 maps the chosen authentication option V1AO3 to corresponding network address information (URL) indicating a corresponding captive portal provided by vendor #1 that is to be used to authenticate communication device 120-1. In this example, the vendor #1 authentication manager 165-1 maps the authentication option V1AO3 assigned by the wireless access service provider 107 to URL13. The URL13 provides a location of a web page WP13 (captive portal) to be used to authenticate the communication device 120-1.

In furtherance of authenticating the respective communication device 120-1 and corresponding user 108-1, the vendor #1 authentication manager 165-1 forwards the appropriate network address information (such as redirect URL13) to the authentication resource 155. As a response to the original query from the authentication resource 155 for an identity of a captive portal to be used for authentication, the authentication resource 155 generates and transmits the communication 114 including the redirect URL13 to the gateway resource 140.

Accordingly, the gateway resource 140 receives notification of a respective server resource (such as vendor #1 server resource 195-1) and captive portal (web page WP13) to be used to authenticate the communication device 120-1. As further discussed below, the gateway resource 140 enforces authentication of the communication device 120-1 using authentication option V1AO3.

For example, in response to receiving the communication 114 indicating a redirect to URL13, the gateway resource 140 generates and transmits communication 115 (redirect notification) to the communication device 120-1. The communication 115 (redirect notification) notifies the communication device 120-1 to retrieve the web page WP13 using URL13.

As shown, the vendor #1 authentication server resource 195-1 is configured to serve webpage WP13 (captive portal for authentication option V1AO3) from a respective network address associated with URL13.

Thus, in response to receiving the redirect notification in communication 115, the communication device 120-1 uses the URL13 (as indicated by the communication 115) to retrieve the web page WP13 from server resource 195-1 via communications 116. To retrieve web page WP13 using URL13, the communication device 120-1 transmits communications 116 over wireless communication link 128-1 through wireless access point 105-1 to gateway resource 140. Gateway resource 140 forwards the request for web page WP13 to the address associated with URL13 over network 190-1 to the server resource 195-1.

Via communications 117, the server resource 195-1 serves web page WP13 to communication device 120-1 through gateway resource 140 and wireless access point 105-1 for display on display screen 130.

Accordingly, the gateway resource 140 can be configured to send a redirect message to the client device (communication device 120-1) triggering the client device to send a request (communication 116) to the specified URL (URL13) to retrieve web page WP13 for display on display screen 130. As previously mentioned, instead of immediately transmitting the content (Google™ web page) requested by the communication device 120-1 as indicated in initial communication 112, via generation and transmission of redirect notification in communication 115 to the communication device 120-1, the communication device 120-1 is redirected to retrieve web page WP13 for authentication as further discussed below.

Figure 2:
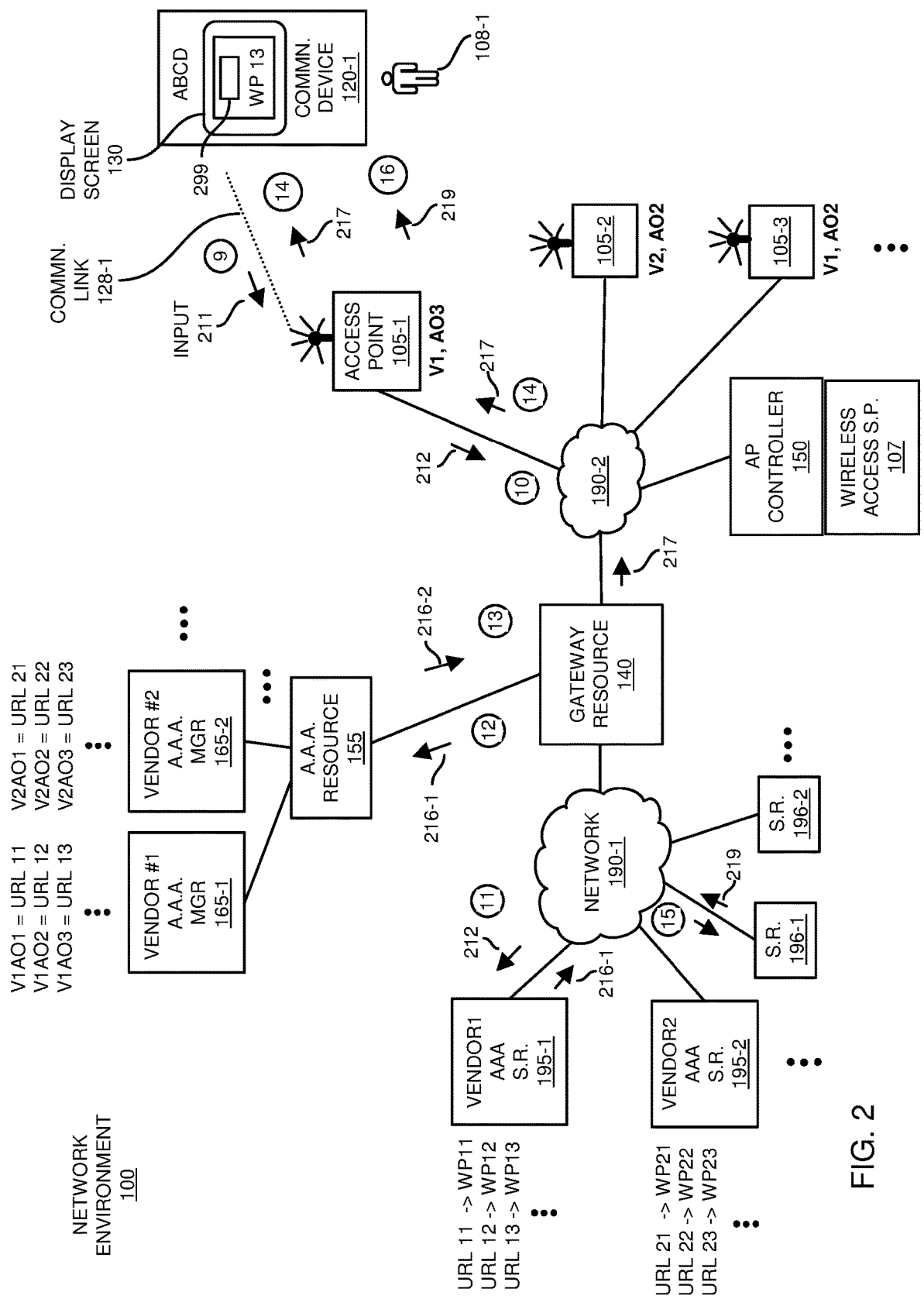
FIG. 2 is an example diagram illustrating a network environment and authentication of a respective communication device using the first selected authentication option according to embodiments herein.

As further shown in FIG. 2, the communication device 120-1 initiates display of the corresponding webpage WP13 (captive portal) on display screen 130. The web page WP13 can be configured to notify the user 108-1 to input appropriate data such as credentials in one or more data fields 299. The user 108-1 inputs requested credentials (any suitable information such as guest room number, guest name, etc.) to the webpage WP13 to use wireless access point 105-1 to access network 190-1. The credentials can include any suitable information such as a name of the respective user 108-1, password provided by the wireless access service provider 107, hotel room number in which the user 108-1 resides in a respective hotel, hotel guest name, user code, passcode, etc.

Via communication 211, the communication device 120-1 transmits credentials inputted by the user 108-1 over the wireless communication link 128-1 to the wireless access point 105-1. The wireless access point 105-1 generates and transmits communication 212 (including the credentials inputted by the user 108-1) over network 190-2 through gateway resource 140 and network 190-1 to the vendor #1 authentication server resource 195-1 (source of web page WP13). The vendor #1 authentication server resource 195-1 stores the data (credential authentication option other suitable information as) received in the communication 212 and potentially makes such data available to the wireless access service provider 107.

The vendor #1 authentication server resource 195-1 may be configured to apply one or more rules to determine whether or not the requesting communication device 120-1 should be afforded use of the wireless access point 105-1 and gateway resource 140 to access network 190-1.

In one embodiment, the captive portal associated with web page WP13 requires that the respective user 108-1 provide a guest room number as well as a corresponding guest name (associated with user 108-1) of the guest residing in the identified guest room number. Such information is known because, upon check-in to the respective hotel, the user 108-1 provides her guest name and is assigned a respective guest room number. Accordingly, the guest name and corresponding guest room information is known prior to the corresponding user 108-1 attempting to use the wireless access point 105-1.

In accordance with further embodiments, assume that the vendor #1 authentication server resource 195-1 analyzes the credentials received from the communication device 120-1 (user 108-1) and determines from the analysis that the communication device 120-1 is authorized to use the wireless access point 105-1 to access the network 190-1 such as the Internet. In other words, the guest name and guest room number received in credentials from the communication device 120-1 are determined to match those assigned at check-in.

In one embodiment, via communication 216-1, the vendor authentication server 195-1 notifies the (service provider) AAA resource 155 of successful authentication of the communication device 120-1 to access network 190-1 through gateway resource 140. Via communication 216-2, the AAA resource 155 notifies the gateway resource 140 that the communication device 120-1 has been successfully authenticated. Because the gateway resource 140 receives notification, via communication 216-2 from the AAA resource 155, of the authorization of communication device 120-1, the gateway resource 140 sends a post-authentication redirect message to the communication device 120-1. This redirects the communication device 120-1 to retrieve the original requested web page (requested Google™ web page). The communication device 120-1 retrieves the requested web page and initiates display of the requested content (Google™ web page) on display screen 130 for viewing by the respective user 108-1.

Accordingly, upon first use of a respective wireless network provided by the wireless access service provider 107, the user 108-1 and corresponding communication device 120-1 are redirected to vendor #1 authentication server resource 195-1 for authentication (via authentication option V1AO3) prior to being able to use the wireless communication link 128-1 to access network 190-1 such as the Internet through the gateway resource 140 (wireless access gateway). Subsequent to the authentication, the communication device 120-1 is then able to access any of the server resources in network environment 100 such as server resource 196-1, 196-2, etc.

FIG. 3 is an example diagram illustrating assignment (and mapping) of different authentication options to different wireless access points according to embodiments herein.

As shown in this example embodiment, the mapping information 375 indicates assignments of the different vendor authentication options (between wireless access service provider 107) to the different wireless access points 105. As previously discussed, the wireless access service provider 107 produces the mapping information 375 to indicate which authentication option (has been assigned by the wireless access service provider 107 and) is to be used with each respective wireless access point and geographical region.

Further in this example embodiment, the mapping information 375 provided, produced, assigned, etc., by wireless access service provider 107 indicates that the wireless access point 105-1 supports the SSID name of HOTEL1 (such as the name of the hotel providing the wireless services) and that the wireless access point 105-1 is assigned an authentication option AO3 provided by vendor #1 (V1); the mapping information 375 indicates that the wireless access point 105-2 supports the SSID name of HOTEL1 and that the wireless access point 105-2 is assigned an authentication option AO2 provided by vendor #2 (V2); the mapping information 375 provided by wireless access service provider 107 indicates that the wireless access point 105-3 supports the SSID name of HOTEL1 and that the wireless access point 105-3 is assigned an authentication option AO2 provided by vendor #1 (V1); etc.

Thus, even though the wireless access points 105 support the same network SSID name of HOTEL1, each of the wireless access points requires a different type of authentication to access network 190-1 through the respective wireless access point and gateway resource 140.

More specifically, as previously discussed, the authentication option V1AO3 assigned to authenticate communication devices connected to wireless access point 105-1 may require that a user provide a hotel guest room number and a corresponding guest name to use wireless access point 105-1 and gateway resource 140 to access the network 190-1 such as the Internet.

The authentication option V2AO2 assigned to authenticate communication devices connected to wireless access point 105-2 may require that a user and corresponding communication device provide a conference room number and a business name (to which the corresponding user is affiliated) to use wireless access point 105-2 and gateway resource 140 to access the network 190-1 such as the Internet.

The authentication option V1AO2 assigned to authenticate communication devices connected to wireless access point 105-3 may require that a user and corresponding communication device provide a table number in the dining room to use wireless access point 105-3 and gateway resource 140 to access the network 190-1 such as the Internet.

In this manner, the wireless access service provider 107 is able to assign different types of authentication to different geographical locations, different wireless access points, etc.

Note that assignment of the vendor authentication options can be based on any suitable parameter. In other words, instead of being assigned to different wireless access points in the above example, different types of vendor authentication can be assigned to different entities or parameters based on sub-network names, identities of communication device attempting to access network 190-1, user/communication device location, etc.

Figure 4:
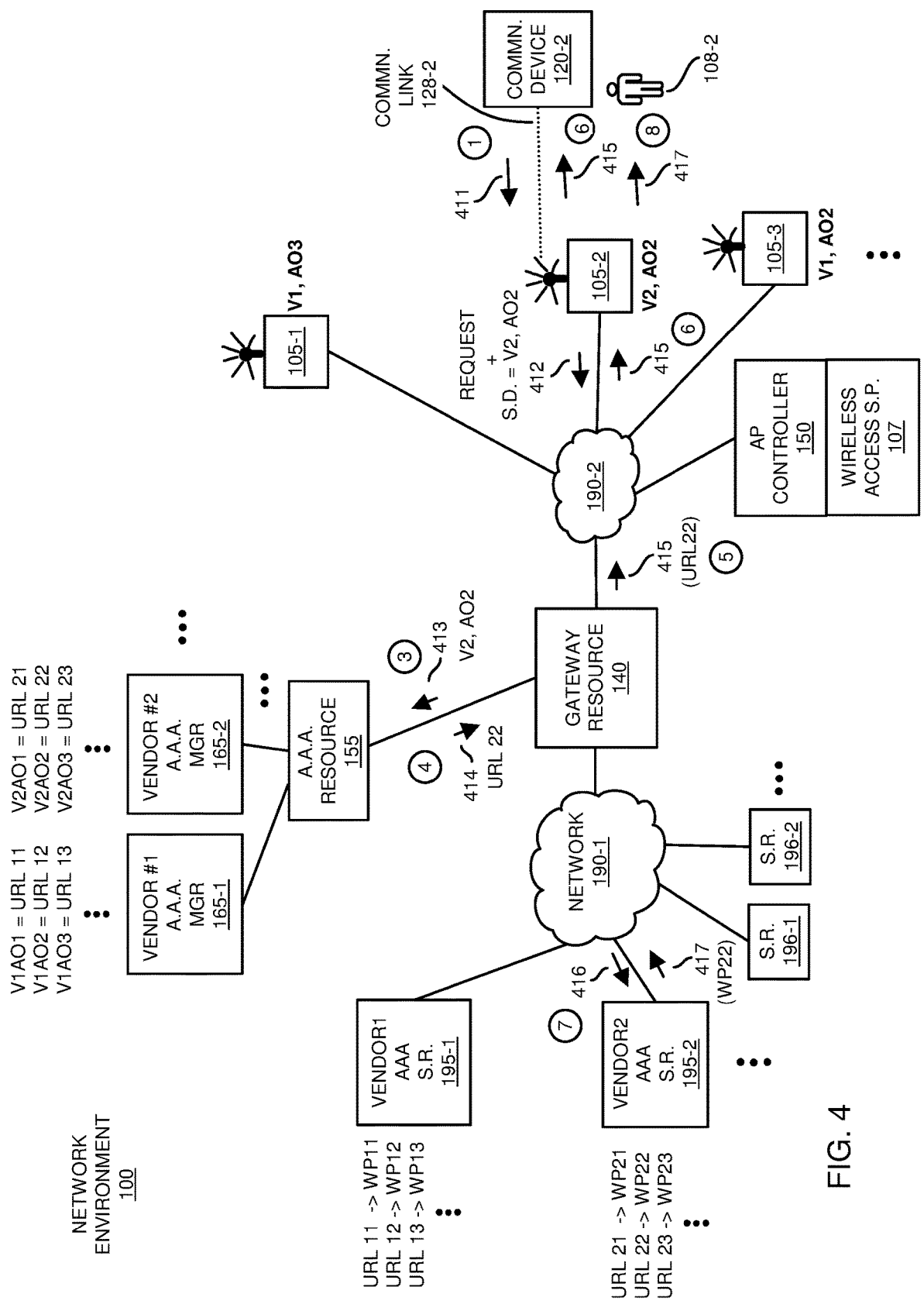
FIG. 4 is an example diagram illustrating a network environment and authentication of a respective communication device in accordance with a second selected authentication option according to embodiments herein.

FIG. 4 is an example diagram illustrating a network environment and authentication of a respective communication device in accordance with a second selected authentication option according to embodiments herein.

More specifically, as shown in FIG. 4, assume that the user 108-2 operating the communication device 120-2 wishes to access a remote network such as network 190-1 and server resource 196-2 using wireless services (via wireless access points 105) provided by the wireless access service provider 107. In such an instance, the user 108-2 opens a respective browser application on a display screen of the communication device 120-2. The communication device 120-2 then communicates with the wireless access point 105-2 to establish the wireless communication link 128-2.

Further in this example embodiment, assume that the user inputs, to the browser, webpage information (such as Google™) indicating a corresponding website to retrieve.

To retrieve the content (Google™ web page) requested by the user 108-2, the communication device 120-2 transmits communication 411 (including the request for content) over the communication link 128-2 to the wireless access point 105-2.

The user 108-2 and/or corresponding communication device 120-2 has not yet been authenticated to use gateway resource 140. The wireless access point 105-2 forwards the request for content (webpage information) as well as supplemental data indicating the authentication option (V2AO2) assigned to the wireless access point 105-2.

In one embodiment, the supplemental data from the wireless access point 105-2 or other suitable resource includes a first data portion and a second data portion. The first data portion (such as first bits of information) indicates which of multiple candidate vendors has been chosen by the wireless access service provider 107 to authenticate a communication device 120-2 attempting to access remote network 190-1. The second data portion of the supplemental data (such as second bits of information) indicates which of one or more available authentication options provided by the chosen candidate vendor has been chosen by the wireless access service provider 107 to authenticate the communication device 120-2 attempting to use the wireless access point 105-1.

Thus, in this example embodiment, the supplemental data (indicating an authentication option) in the communication 412 communicated from the wireless access point 105-2 to the gateway resource 140 includes first bits indicating vendor #2 (V2) and second bits indicating authentication option #2 (AO2). In this manner, the gateway resource 140 (wireless access gateway) receiving the supplemental data communication 412 is informed of which of multiple possible available authentication options has been assigned by the wireless access service provider 107 to authenticate the respective communication device 120-2 using the wireless access point 105-2.

Instead of retrieving the originally requested Google™ web page as indicated by communication 412 and immediately conveying the Google™ web page back through network 190-2 and wireless access point 105-2 to the communication device 120-2, the gateway resource 140 detects that it needs to first authenticate the communication device 120-2.

To authenticate the communication device 120-2, the gateway resource 140 communicates with the authentication resource 155. In one embodiment, the gateway resource 140 generates the communication 413 (to the authentication resource 155) to include supplemental data such as first bits indicating vendor #2 (V2) and second bits indicating authentication option #2 (AO2).

In one embodiment, the authentication resource 155 uses the first bits (or supplemental data in general) to identify which of the multiple vendors has been selected to perform authentication. In this example, the first bits of supplemental data received in communication 413 indicate vendor #2 (V2). Accordingly, the authentication resource 155 knows to communicate an authentication request to vendor #2 authentication manager 165-2.

In one embodiment, the authentication resource 155 forwards the second bits of the received supplemental data to vendor #1 authentication manager 165-2 as well. The second bits (as previously discussed) notify the vendor #1 authentication manager 165-2 that the authentication option V2AO2 was chosen by the wireless access service provider 107 to authenticate the communication device 120-2 and corresponding user 108-2.

Upon receipt of the authentication request from gateway resource 140 including supplemental data indicating authentication option V2AO2, the vendor #2 authentication manager 165-2 maps the chosen authentication option V2AO2 to corresponding network address information (URL) indicating a corresponding captive portal provided by vendor #2 that is to be used to authenticate communication device 120-2. In this example, the vendor #2 authentication manager 165-2 maps the authentication option V2AO2 assigned by the wireless access service provider 107 to URL22. As further discussed below, the URL22 provides a location of a web page WP22 to be used to authenticate the communication device 120-2.

In furtherance of authenticating the respective communication device 120-2 and corresponding user 108-2, the vendor #2 authentication manager 165-2 forwards the appropriate network address information (such as redirect URL22) to the authentication resource 155. In response to receiving the network address information indicating a captive portal to be used for authentication, the authentication resource 155 generates and transmits the communication 414 including the redirect URL22 to the gateway resource 140.

Accordingly, the gateway resource 140 receives notification of a respective server resource (such as vendor #2 server resource 195-2) to be used to authenticate the communication device 120-2.

In response to receiving the communication 414 indicating redirect URL22, the gateway resource 140 generates and transmits communication 415 (including URL22) to the communication device 120-2. The communication 415 redirects the communication device 120-2 to retrieve web page WP22 (captive portal) associated with URL22 from server resource 195-2.

As shown, the vendor #2 authentication server resource 195-2 is configured to serve webpage WP22 (captive portal for authentication option V2AO2) from a respective network address associated with URL22.

To retrieve web page WP22, the communication device 120-2 communicates a request for web page WP22 in communications 416 to the server resource 195-2. To satisfy the request for webpage WP22 as indicated in communication 416, the vendor #2 authentication server resource 195-2 generates and transmits communication 417 (including webpage WP22 to authenticate the communication device 120-2) through the gateway resource 140 to communication device 120-2. Communication device 120-2 displays retrieved web page WP22 on a respective display screen.

Figure 5:
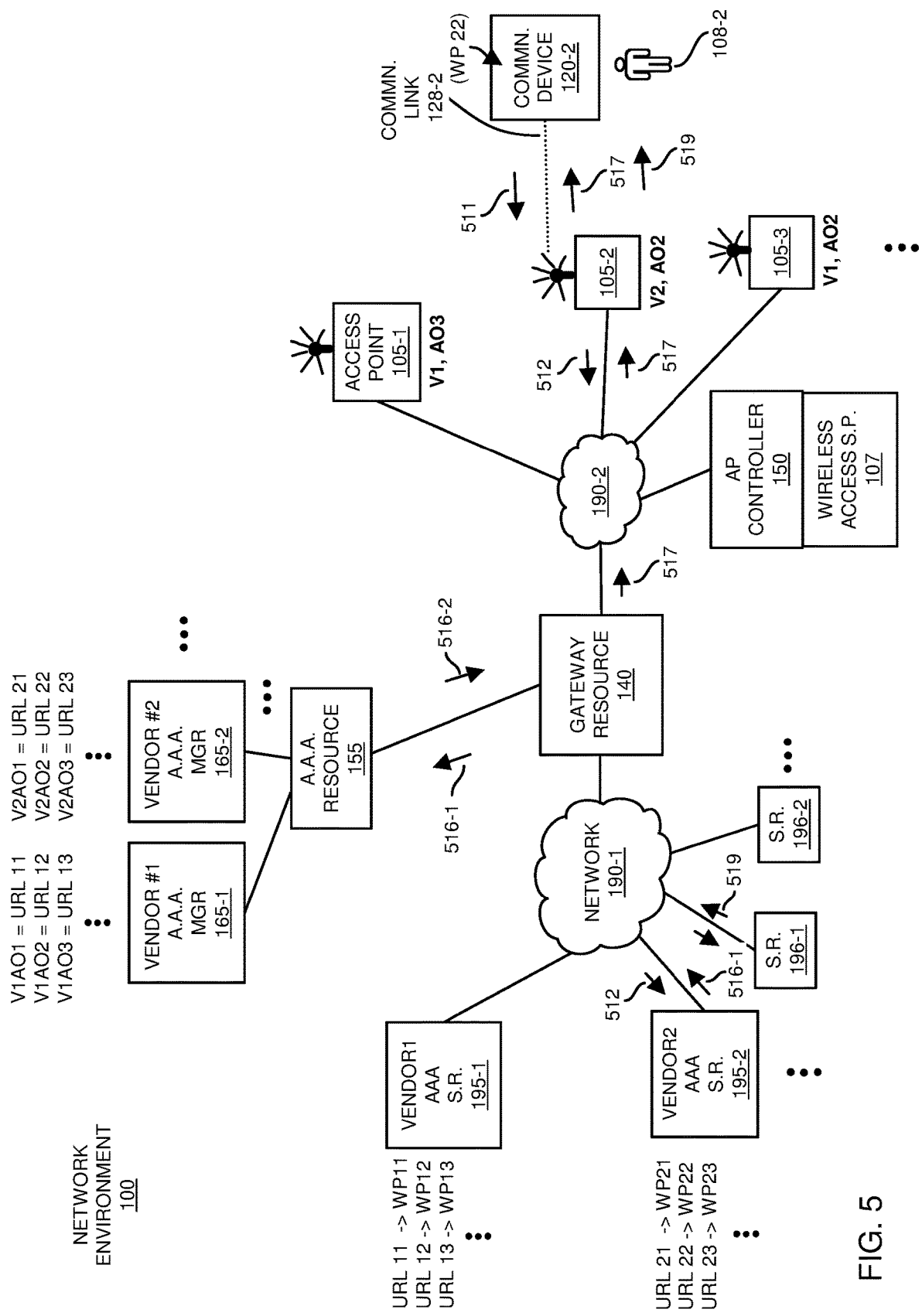
FIG. 5 is an example diagram illustrating a network environment and authentication of a respective communication device using the second selected authentication option according to embodiments herein.

As further shown in FIG. 5, the communication device 120-2 initiates display of the corresponding webpage WP22 (captive portal) on a respective display screen of communication device 120-2. The web page WP22 notifies the user 108-2 to input appropriate data such as credentials in respective displayed data fields. The user 108-2 inputs requested credentials (any suitable information such as conference room number, business name, etc.) to the webpage WP22 to use wireless access point 105-2 to access network 190-2. The credentials can include any suitable information such as a name of the respective user 108-2, password provided by the wireless access service provider 107, hotel room number in which the user 108-2 resides in a respective hotel, hotel guest name, conference room number, business name, user code, passcode, etc.

Via communication 511 in this example embodiment, the communication device 120-2 transmits credentials inputted by the user 108-2 over the wireless communication link 128-2 to the wireless access point 105-2. The wireless access point 105-2 transmits communication 512 (including the credentials inputted by the user 108-2 and/or communication device 120-2) over network 190-2 through gateway resource 140 and network 190-2 to the vendor #2 authentication server resource 195-2 (source of web page WP22). The vendor #2 authentication server resource 195-2 stores the data (credential authentication option other suitable information as) received in the communication 512 and potentially makes such data available to the wireless access service provider 107.

The vendor #2 authentication server resource 195-2 may be configured to apply one or more rules to determine whether or not the requesting communication device 120-2 should be afforded use of the wireless access point 105-2 and gateway resource 140 to access network 190-1.

In one embodiment, the captive portal associated with web page WP22 requires that the respective user 108-2 provide a conference room number as well as a business name (associated or affiliated with user 108-2) of the guest attempting to use the wireless access point 105-2. Such information is known because, prior to or upon check-in to the respective hotel, the user 108-2 provides the business name associated with the user. Accordingly, the business name is known prior to the corresponding user 108-2 attempting to use the wireless access point 105-2.

In accordance with further embodiments, assume that the vendor #2 authentication server resource 195-2 analyzes the credentials received from the communication device 120-2 (user 108-2) and determines from the analysis that the communication device 120-2 is authorized to use the wireless access point 105-2 to access the network 190-1 such as the Internet. In other words, the business name and conference room number received in credentials from the communication device 120-2 are determined to match those assigned at or prior to check-in. In such an instance, via communication 516-1, the vendor authentication server 195-2 notifies the (service provider) AAA resource 155 of successful authentication of the communication device 120-2 to access network 190-1 through gateway resource 140.

Via communication 516-2, the AAA resource 155 notifies the gateway resource 140 that the communication device 120-2 has been successfully authenticated. Because the gateway resource 140 receives notification of the authorization of communication device 120-2 via communication 516-2 from the AAA resource 155, the gateway resource 140 sends a post-authentication redirect message to the communication device 120-2, which redirects the communication device 120-2 to retrieve the original requested web page (Google™ web page). The communication device 120-2 receives the requested web page via communication 519 and initiates display of the requested content (Google™ web page) on a respective display screen for viewing by the respective user 108-2.

Accordingly, upon first use of a respective wireless network provided by the wireless access service provider 107, the user 108-2 and corresponding communication device 120-2 are redirected to vendor #2 authentication server resource 195-2 for authentication (via authentication option V2AO2) prior to being able to use the wireless communication link 128-2 to access network 190-1 such as the Internet through the gateway resource 140 (wireless access gateway). Subsequent to the authentication, the communication device 120-2 is then able to access any of the server resources in network environment 100 such as server resource 196-1, 196-2, etc.

FIG. 6 is an example diagram illustrating assignment (and mapping) of different authentication options assigned to different sub-networks of respective wireless access points according to embodiments herein.

More specifically, as shown, the mapping information 675 indicates assignments of the different vendor authentication options to different sub-network names supported by each of the wireless access points 105. As previously discussed, the wireless access service provider 107 produces the mapping information 675 to indicate which authentication option is to be used with each respective wireless access point and sub-network name.

Further in this example embodiment, the mapping information 675 provided, produced, assigned, etc., by wireless access service provider 107 indicates that the wireless access point 105-1 supports the SSID name of the HOTEL1-1 (such as a first sub-network supported by wireless access point 105-1) and that this sub-network is assigned an authentication option AO3 provided by vendor #1 (V1); the map information 675 indicates that the wireless access point 105-1 also supports the SSID name of HOTEL1-2 (such as a second sub-network supported by wireless access point 105-1) and that this second sub-network is assigned an authentication option AO1 provided by vendor #2 (V2); the map information 675 indicates that the wireless access point 105-1 supports the SSID name of HOTEL1-3 (such as a third sub-network supported by wireless access point 105-1) and that this third sub-network is assigned an authentication option AO2 provided by vendor #1 (V1); and so on.

Thus, the different sub-networks supported by a wireless access point require different types of authentication to access network 190-1 through the respective wireless access point and gateway resource 140.

In this example, the authentication option V1AO3 assigned to authenticate communication devices using sub-network HOTEL1-1 of wireless access point 105-1 may require that a respective user/communication device provide a hotel guest room number and a corresponding guest name to use sub-network HOTEL1-1 of wireless access point 105-1 and gateway resource 140 to access the Internet.

The authentication option V2AO1 assigned to authenticate communication devices connected to sub-network HOTEL1-2 of wireless access point 105-2 may require that a respective user and/or corresponding communication device provide a conference room number and a business name (to which the corresponding user's affiliated) to use sub-network HOTEL1-2 of wireless access point 105-2 and gateway resource 140 to access the Internet.

The authentication option V1AO2 assigned to authenticate communication devices connected to sub-network HOTEL1-3 of wireless access point 105-3 may require that a user and corresponding communication device provide a table number in the dining room to use sub-network HOTEL1-3 of wireless access point 105-3 and gateway resource 140 to access the Internet.

In this manner, the wireless access service provider 107 is able to assign different types of authentication to different sub-networks supported by the wireless access points.

Figure 7:
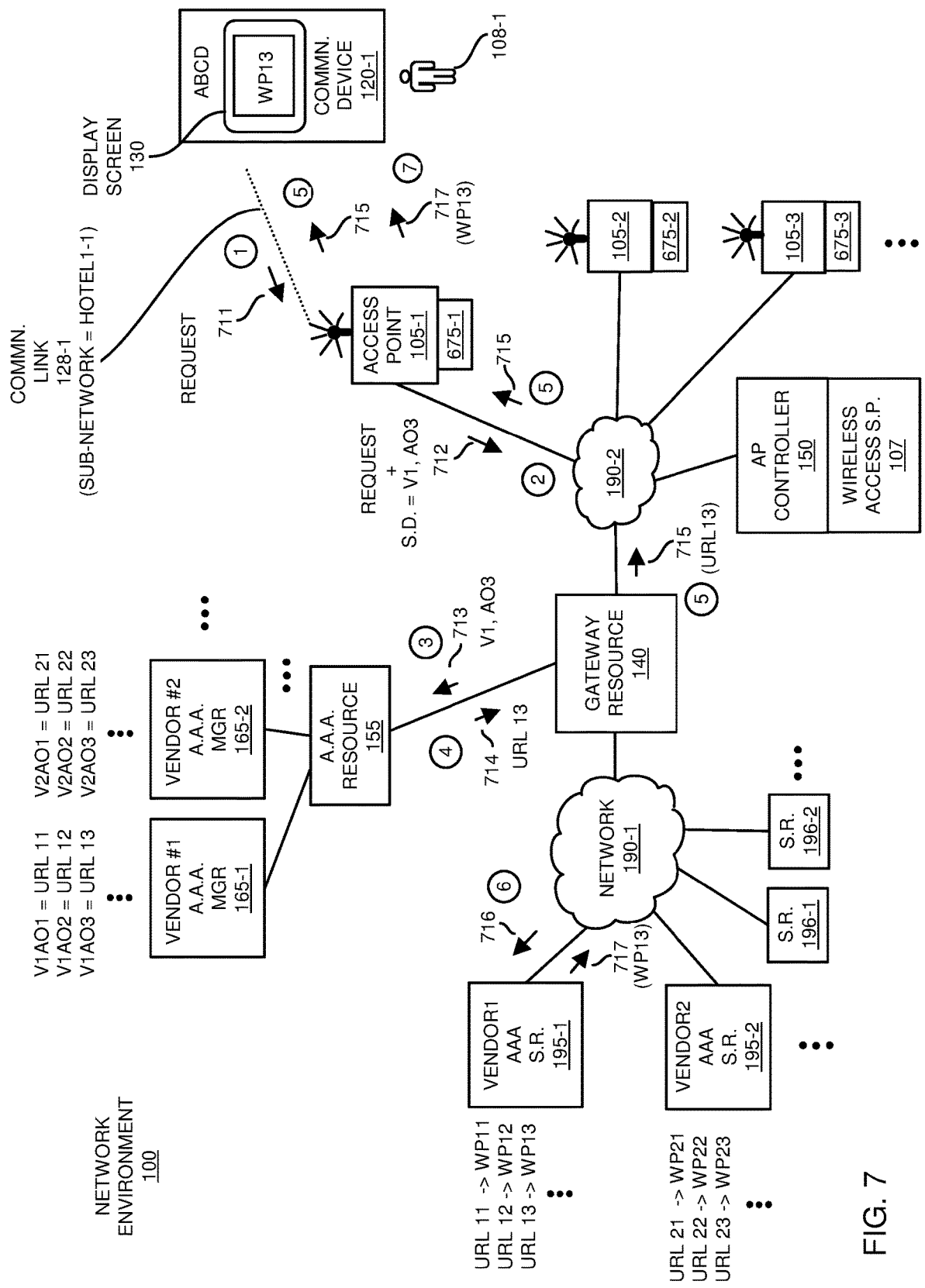
FIG. 7 is an example diagram illustrating a network environment and authentication of a respective communication device in accordance with a selected authentication option according to embodiments herein.

FIG. 7 is an example diagram illustrating a network environment and corresponding authentication of a respective communication device according to embodiments herein.

In this example embodiment, assume that the wireless access point 105-1 supports multiple sub-networks having SSID names of HOTEL1-1, HOTEL1-2, and HOTEL1-3 as indicated by map information 675-1.

Each sub-network requires a different type of authentication to use the respective wireless access point and sub-network. For example, as previously discussed, the sub-network named HOTEL1-1 of wireless access point 105-1 requires a respective communication device and/or corresponding user to be authenticated using authentication option V1AO3; the sub-network named HOTEL1-2 of wireless access point 105-1 requires a respective communication device and/or corresponding user to be authenticated using authentication option V2AO1; the sub-network named HOTEL1-3 of wireless access point 105-1 requires respective communication device and/or corresponding user to be authenticated using authentication option V1AO2.

Accordingly, as previously discussed, different sub-networks may be assigned different types of user authentication.

Assume in this example that the user 108-1 operating the communication device 120-1 selects an appropriate SSID to connect to the sub-network HOTEL1-1 supported by the wireless access point 105-1 during an association and establishing the wireless communication link 128-1.

Subsequent to opening, assume that the user 108-1 generates a request to retrieve a respective webpage using the browser. The communication device 120-1 transmits the request in communication 711 over the wireless communication link 128-1 to the wireless access point 105-1.

The communication device 120-1 has not yet been authenticated for use of the wireless access point 105-1 and gateway 140. In such an instance, in addition to forwarding the request for content to the gateway resource 140, the access point 105-1 sends supplemental data (such as an identity of an authentication option to be used to authenticate the communication device 120-1 corresponding user 108-1) to the gateway resource 140. In one embodiment, the wireless access point 105-1 determines which data to include as supplemental data depending upon a corresponding sub-network is selected to connect the communication device 120-1 to the wireless access point 105-1.

For example, recall that the communication link 128-1 is established over the sub-network HOTEL1-1. To determine which authentication option is to be used to authenticate communication device 120-1, the wireless access point 105-1 uses the map information 675-1. Since the mapping information 675-1 indicates that SSID name HOTEL1-1 maps to authentication option V1AO3, the wireless access point 105-1 produces the supplemental data in communication 712 to include the identity of the authentication option V1AO3. The communication 712 notifies the gateway resource 140 which of multiple authentication options is to be used to authenticate the communication device 120-1.

In a similar manner as previously discussed, the gateway resource 140 generates communication 713 to indicate the selected authentication option V1AO3. Accordingly, the authentication resource 155 receives notification of the authentication option to be used to authenticate the communication device 120-1.

The authentication resource 155, in turn, communicates with the vendor #1 authentication manager 165-1 to determine a respective URL to be used to authenticate the communication device 120-1 and corresponding user 108-1.

In this instance, the vendor #1 authentication manager 165-1 maps the selected authentication option V1AO3 to network address information such as URL13. The vendor #1 authentication manager 165-1 forwards the URL13 to the authentication resource 155. The authentication resource 155, in turn, forwards the URL13 in communication 714 to the gateway resource 140.

Accordingly, the gateway resource 140 receives notification of a respective URL (URL13) that is to be used to authenticate the communication device 120-1. The gateway resource 140 redirects the communication device 120-1 to a respective webpage WP13 (captive portal) in order to authenticate the respective communication device 120-1 and corresponding user 108-1.

More specifically, via communication 715, the gateway resource 140 forwards the redirect URL13 to the communication device 120-1. The communication device 120-1 uses the received URL13 to request, via communication 716, retrieval of respective webpage WP13 from the vendor1 authentication server resource 195-1.

In response to receiving the communication 716, the vendor #1 authentication server resource 195-1 forwards the requested webpage information (captive portal webpage WP13) in communication 717 over network 190-1 through the gateway resource 140 to the communication device 120-1.

Via further communication 717 from the server resource 195-1, the gateway resource 140 forwards the retrieved webpage information WP13 over network 190-2 to the wireless access point 105-1. The wireless access point 105-1, in turn, forwards the webpage information WP13 in communication 717 over the wireless communication link 128-1 to the communication device 120-1 for display on a respective display screen 130 of communication device 120-1.

In a similar manner as previously discussed, the user 108-1 inputs appropriate credential information to the webpage WP13 in order to be authenticated for further use of the wireless access point wire 105-1 and gateway resource 140 via wireless sub-network HOTEL1-1 of the wireless access point 105-1.

Figure 8:
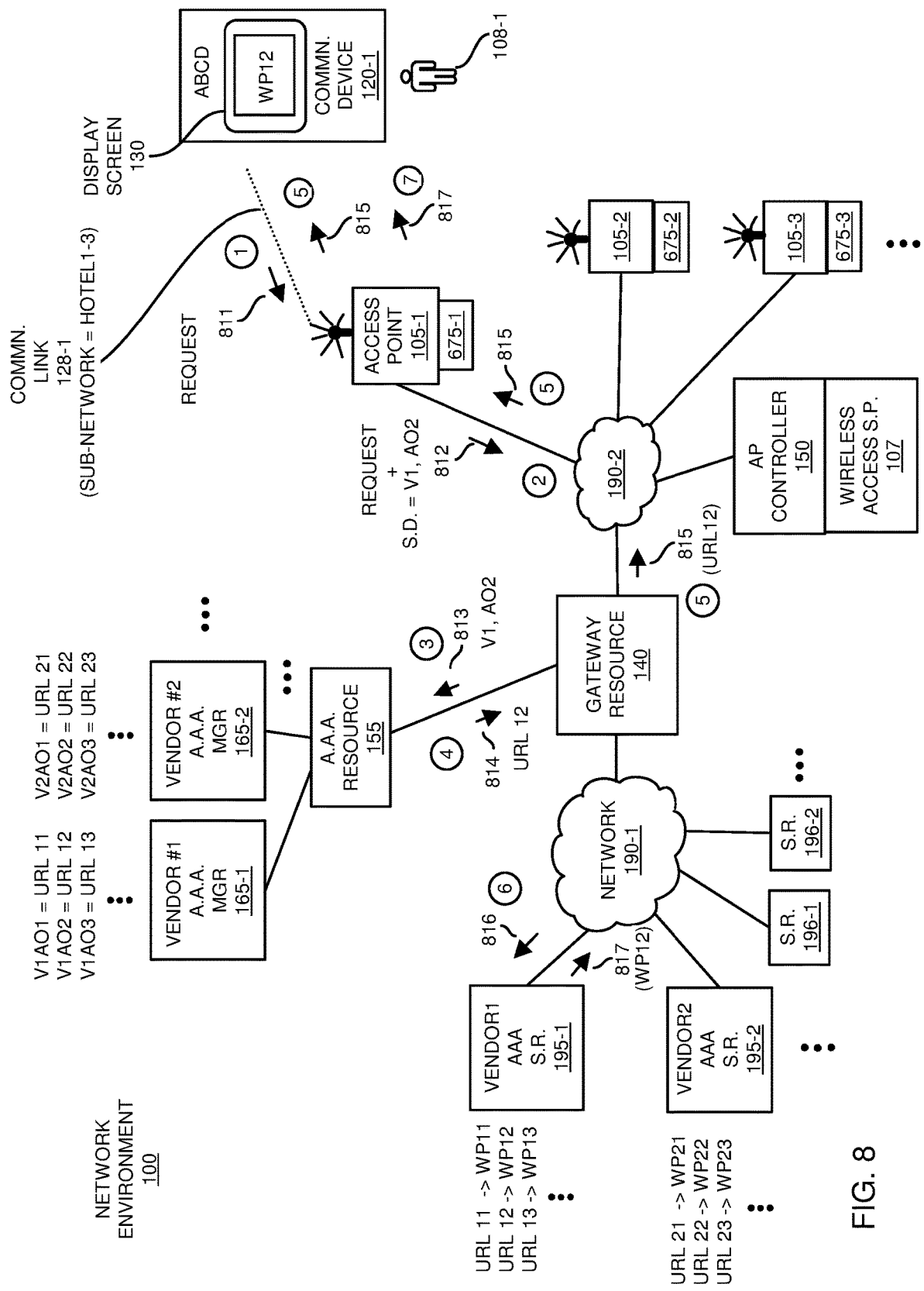
FIG. 8 is an example diagram illustrating a network environment and authentication of a respective communication device in accordance with a selected authentication option according to embodiments herein.

FIG. 8 is an example diagram illustrating a network environment and authentication of a respective communication device in accordance with a selected authentication option according to embodiments herein.

As previously discussed, in this example embodiment, assume that the wireless access point 105-1 supports multiple sub-networks having SSID names of HOTEL1-1, HOTEL1-2, and HOTEL1-3 as indicated by map information 675-1. Accordingly, different sub-networks may be assigned different types of user authentication.

Assume in this example that the user 108-1 operating the communication device 120-1 selects an appropriate SSID of wireless access point 105-1 to connect to the sub-network HOTEL1-3 supported by the wireless access point 105-1 during an association of establishing of wireless communication link 128-1.

Assume that the user 108-1 generates a request to retrieve a respective webpage using an opened browser. The communication device 120-1 transmits the request in communication 811 over the wireless communication link 128-1 to the wireless access point 105-1.

The communication device 120-1 has not yet been authenticated for use of the wireless access point 105-1 and gateway 140. In such an instance, in addition to forwarding the request for content to the gateway resource 140, the access point 105-1 sends supplemental data (such as an identity of an authentication option to be used to authenticate the communication device 120-1 corresponding user 108-1) to the gateway resource 140.

In one embodiment, the wireless access point 105-1 determines which data to include in communication 812 as supplemental data depending upon a corresponding sub-network used to connect the communication device 120-1 to the wireless access point 105-1.

For example, recall that the communication link 128-1 is established over the sub-network HOTEL1-3. To determine which authentication option is to be used to authenticate communication device 120-1, the wireless access point 105-1 uses the map information 675-1. Since the mapping information 675-1 indicates that SSID name HOTEL1-3 maps to authentication option V1AO2, the wireless access point 105-1 produces the supplemental data in communication 812 to include the identity of the authentication option V1AO2. The communication 812 notifies the gateway resource 140 which of multiple authentication options is to be used to authenticate the communication device 120-1.

In a similar manner as previously discussed, the gateway resource 140 generates communication 813 to indicate the selected authentication option V1AO2. Accordingly, the authentication resource 155 receives notification of the authentication option to be used to authenticate the communication device 120-1.

The authentication resource 155, in turn, communicates with the vendor #1 authentication manager 165-1 to determine a respective URL to be used to authenticate the communication device 120-1 and corresponding user 108-1.

In this instance, the vendor #1 authentication manager 165-1 maps the selected authentication option V1AO2 to network address information such as URL12. The vendor #1 authentication manager 165-1 forwards the URL12 to the authentication resource 155. The authentication resource 155, in turn, forwards the URL12 in communication 814 to the gateway resource 140.

Accordingly, the gateway resource 140 receives notification of a respective URL (URL12) that is to be used to authenticate the communication device 120-1. The gateway resource 140 redirects the communication device 120-1 to retrieve a respective webpage WP12 (captive portal) in order to authenticate the respective communication device 120-1 and corresponding user 108-1. More specifically, in this example embodiment, the gateway resource 140 forwards the redirect URL12 to the communication device 120-1 via communications 815. The communication device 120-1 uses the URL12 (via communications 816) to request and retrieve web page WP12 from server resource 195-1.

In response to receiving the communication 816, the vendor #1 authentication server resource 195-1 forwards the requested webpage information (captive portal webpage WP12) in communication 817 over network 190-1 to the gateway resource 140. Via further communication 817, the gateway resource 140 forwards the retrieved webpage information WP12 over network 190-2 to the wireless access point 105-1. The wireless access point 105-1, in turn, forwards the webpage information WP 12 in communications 817 over the wireless communication link 128-1 to the communication device 120-1 for display on display screen 130.

In a similar manner as previously discussed, the user 108-1 inputs appropriate credential information to the webpage WP12 (and server resource 195-1) in order to be authenticated for further use of the wireless access point wire 105-1 and gateway resource 140 via wireless sub-network HOTEL1-3 of the wireless access point 105-1.

In this manner, wireless access service provider 107 is able to control which authentication option is used to authenticate users based on an identity of a particular wireless sub-network.

Note that any suitable parameter can be used to determine which of multiple authentication options is to be used to authenticate a respective communication device. For example, the wireless access point can be configured with location information indicating its location. The wireless access point can be configured to forward the location information to the gateway resource 140, which in turn, uses the location information to identify an appropriate authentication option to be used to authenticate the communication device. Accordingly, the location information can be subsequently used to identify which authentication option is to be used as opposed to an SSID.

Figure 9:
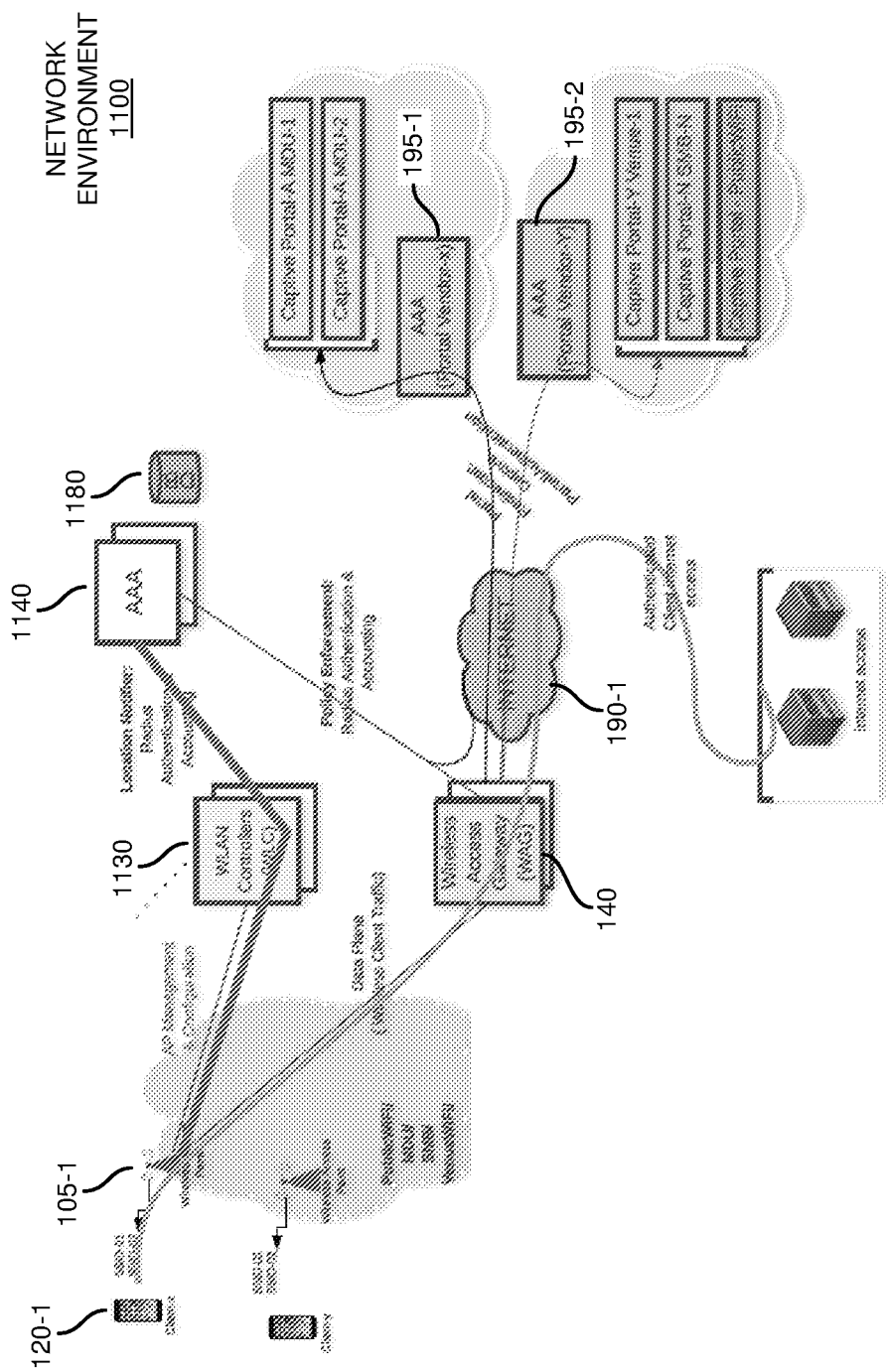
FIG. 9 is an example diagram illustrating use of location information to select one of multiple vendor portals in which to perform authentication according to embodiments herein.

FIG. 9 is an example diagram illustrating use of location information to select one of multiple vendor portals in which to perform authentication according to embodiments herein.

In this example embodiment, the wireless LAN controller 1130 acts as an anchor Radius proxy to the authentication server 1140. The authentication server 1140 can be operated by the wireless network service provider providing services to the communication device 120-1.

Assume in this example, the operator of the communication device 120-1 establishes (or attempts to establish) a respective wireless communication link with the wireless access point 105-1. In one embodiment, the wireless access point 105-1 receives location information indicating a location of the respective communication device 120-1. The wireless access point 105-1 can be configured to determine or be notified of a location of the wireless communication device 120-1 in any suitable manner. For example, in one embodiment, the client device may be configured to forward GPS latitude and longitude information to the wireless access point 105-1; the location of the client device 120-1 may be based upon a known location of the wireless access point 105-1; etc.

As further discussed herein, any of the resources in the network environment 1100 such as wireless access point 105-1, wireless LAN controller 1130, authentication server 1140, wireless access gateway 140, authentication server 195-1, authentication server 195-2, etc., can be used to select a particular vendor and or captive portal to perform authentication of the respective communication device 120-1.

In one embodiment, subsequent to receiving the location information as discussed above, wireless access point 105-1 forwards the location information associated with the communication device 120-1 to the wireless LAN controller 1130. Accordingly, the wireless LAN controller 1130 receives notification of the location of the communication device 120-1. The controller 1130 may be able to determine a location of the communication device 120-1 based on knowing a location of the wireless access point 105-1.

In accordance with further embodiments, via further communications, the wireless LAN controller 1130 forwards the location information in a respective location message (such as in a Radius Authentication and Accounting message) to the authentication server 1140. Authentication server 1140 stores the received location identification information in repository 1180.

If desired, the authentication server 1140 can be configured to select which of the multiple authentication options (from different vendors) is to be used to authenticate the communication device 120-1. In such an instance, notice of the selection can be forwarded to the wireless access gateway 140 that enforces authentication of the communication device 120-1 as specified by the selection.

Alternatively, in one embodiment, the wireless access gateway 140 receives notification of the location information and performs a selection of which of the different captive portals is to be used to authenticate the communication device 120-1 based upon the location information received from the authentication server 1140 or other suitable resource. In furtherance of this embodiment, when a client session is initiated, the wireless gateway 140 can be configured to perform a respective authentication transaction with the authentication server 1140. During the authentication transaction, the authentication server 1140 fetches a client's location identifier (i.e., any suitable information indicating a current location of the communication device 120-1) and injects the notification of the communication device 120-1 and corresponding current location in respective Radius transactions to the wireless gateway 140. Accordingly, the wireless gateway 140 can be notified of a respective location of the communication device 120-1.

The wireless gateway 140 makes a selection of an appropriate captive portal to be used to authenticate the communication device 120-1 based upon the location information. In one embodiment, the gateway resource 140 includes map information mapping each of multiple different location information to a respective vendor and captive portal. In furtherance of performing authentication, the wireless access gateway 140 can be configured to enforce the selection by redirecting communications from the communication device 120-1 to the appropriate selected captive portal (such as one of authentication server 195-1, authentication server 195-2, etc.) to perform authentication. In a similar manner as previously discussed, redirection of the communication device 120-1 to the selected captive portal enables the communication device 120-1 (and/or user) to provide appropriate authentication credentials to use a respective wireless communication link to access a remote network such as the Internet.

In accordance with yet further embodiments, note further that server resources 195 (server resource 195-1 and server resource 195-2) can be configured to select which captive portal to use. For example, the authentication server 1140 and/or gateway resource 140 can be configured to include the client location information in required transactions with the portal vendor. More specifically, the wireless gateway 140 can be configured to forward the respective received location information associated with the communication device 120-1 (as received from authentication server 1140) to one or more vendor servers such as server resource 195-1, server resource 195-2, etc. The selected vendor server then uses the location information to select which of the multiple available captive portals is to be used to authenticate the respective communication device 120-1.

In accordance with still further embodiments, in a manner as previously discussed, note again that the wireless access point 105-1 can be configured to identify (such as based on SSID of the wireless access point, location of the communication device 120-1, known location of the wireless access point 105-1, attributes of the user and/or communication device, etc.) which of multiple authentication options available from multiple different vendors that will be used to authenticate the communication device 120-1. Instead of forwarding location information, the wireless access point 105-1 forwards the supplemental data indicating the authentication option and vendor to the server resource 1140. In a similar manner as previously discussed, the gateway resource 140 then enforces redirecting the communication device 120-1 to the appropriate authentication server 195-1 or 195-2 to authenticate the communication device 120-1 using the specified authentication option.

Figure 10:
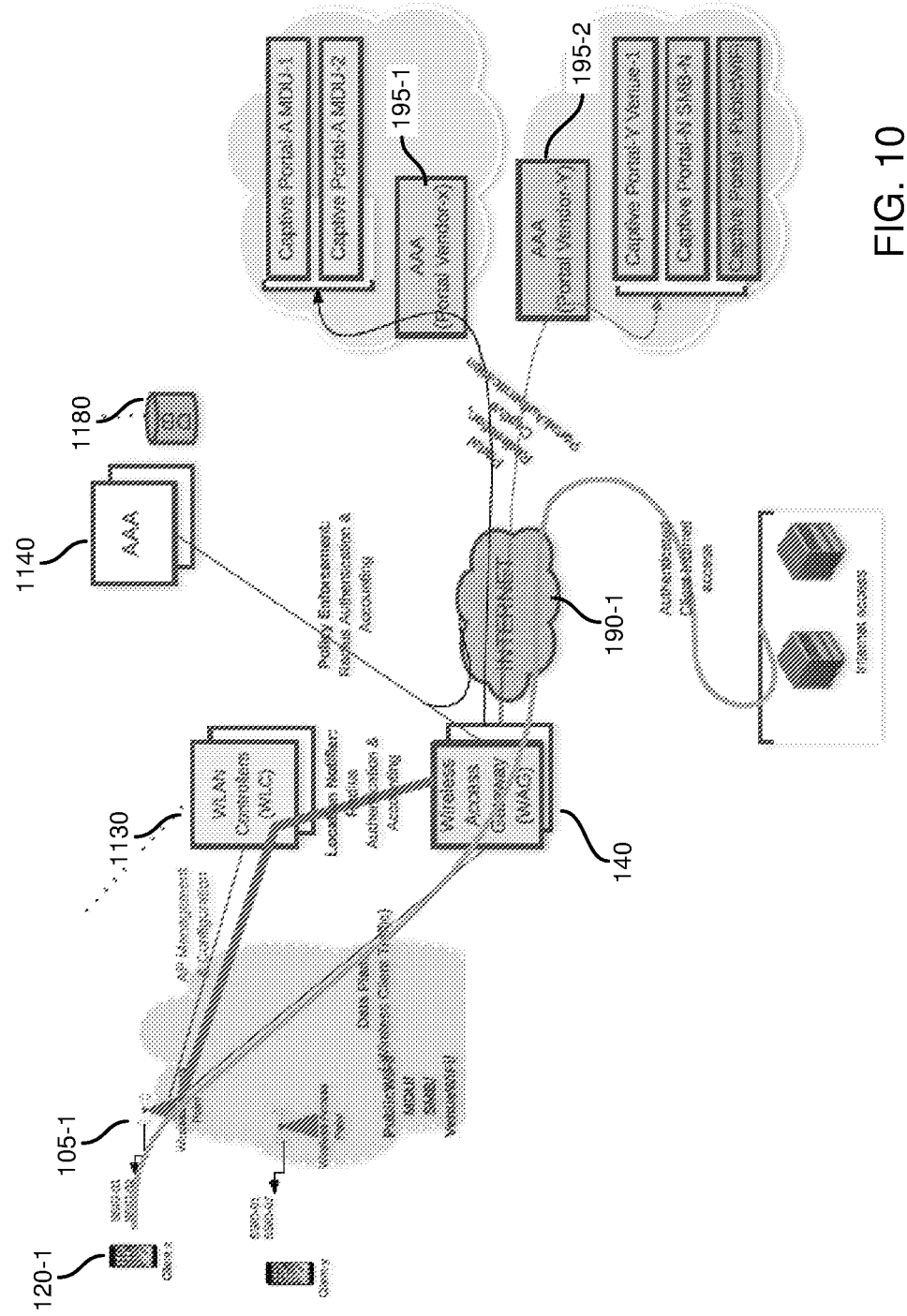
FIG. 10 is an example diagram illustrating use of location information to select one of multiple vendor portals in which to perform authentication according to embodiments herein.

FIG. 10 is an example diagram illustrating use of location information to select one of multiple vendor portals in which to perform authentication according to embodiments herein.

In this example embodiment, the wireless LAN controller 1130 acts as an anchor Radius proxy to the authentication server 1140.

Assume in this example, the operator of the communication device 120-1 establishes (or attempts to establish) a respective wireless communication link with the wireless access point 105-1. In one embodiment, the wireless access point 105-1 receives location information indicating a location of the respective communication device 120-1. The wireless access point 105-1 can be configured to determine a location of the wireless communication device 120-1 can occur in any suitable manner. For example, the client device may be configured to forward GPS latitude and longitude information to the wireless access point. Additionally or alternatively, the location of the client device 120-1 may be based upon a known location of the wireless access point 105-1 such as a location assigned of the wireless access point; location of the wireless access point and/or communication device 120-1 may be known based on so-called civic location configured on the wireless access point; etc.

As further discussed herein, any of the resources in the network environment 1100 such as wireless access point 105-1, wireless LAN controller 1130, authentication server 1140, wireless access gateway 140, authentication server 195, authentication server 195-2, etc., can be used to select a particular vendor and or captive portal to perform authentication of the respective communication device 120-1.

In one embodiment, subsequent to receiving the location information, wireless access point 105-1 forwards the location information associated with the communication device 120-1 (such as GPS information, unique identifier value assigned to the wireless access point 105-1, etc.) to the wireless LAN controller 1130. Accordingly, the wireless LAN controller 1130 receives notification of the location of the communication device 120-1. As further shown, the wireless gateway resource 140 intercepts location information such as location ID from radius transactions received from the wireless LAN controller. The wireless access gateway 140 stores the location information in a client session context associated with the communication device 120-1. Accordingly, the wireless access gateway 140 is notified of the location of the communication device 120-1.

In one embodiment, the wireless access gateway 140 performs a selection of which of the different captive portals is to be used to authenticate the communication device 120-1 based upon location information received from the authentication server 1140 or other suitable resource. In one embodiment, when a client session is initiated, the wireless gateway 140 can be configured to perform a respective authentication transaction with the authentication server 1140. During the authentication transaction, the authentication server 1140 fetches a client's location identifier (i.e., any suitable information indicating a current location of the communication device 120-1) and injects the notification of the communication device 120-1 and corresponding current location in respective Radius transactions to the wireless gateway 140. Alternatively, the wireless gateway resource 140 already has knowledge of the location information as previously discussed and does not need to communicate with the authentication server 1140. Accordingly, the wireless gateway 140 can be notified of a respective location of the communication device 120-1.

In furtherance of this embodiment, the wireless gateway 140 makes a selection of an appropriate captive portal to be used to authenticate the communication device 120-1 based upon the location information. In one embodiment, the gateway resource 140 includes map information mapping each of multiple different location information to a respective vendor and captive portal. In furtherance of performing authentication, the wireless access gateway 140 can be configured to enforce the selection by redirecting communications from the communication device to the appropriate selected captive portal (such as one of authentication server 195-1, authentication server 195-2, etc.) to perform authentication. In a similar manner as previously discussed, redirection of the communication device 120-1 to the selected captive portal enables the communication device 120-1 (and/or user) to provide appropriate authentication credentials to use a respective wireless communication link to access a remote network such as the Internet. In accordance with yet further embodiments, note that the authentication server 1140 and/or gateway resource 140 can be configured to include the client location information in required transactions with the portal vendor. More specifically, in yet further embodiments, the wireless gateway 140 can be configured to forward the respective received location information associated with the communication device 120-1 (as received from authentication server 1140) to one or more vendor servers such as server resource 195-1, server resource 195-2, etc. The vendor server then uses the location information to select which of the multiple available captive portals is to be used to authenticate the respective communication device 120-1.

In accordance with still further embodiments, in a manner as previously discussed, note again that the wireless access point 105-1 can be configured to identify (such as based on SSID of the wireless access point, location of the communication device 120-1, known location of the wireless access point 105-1, attributes of the user and/or communication device, etc.) which of multiple authentication options available from multiple different vendors that will be used to authenticate the communication device 120-1. Instead of forwarding location information, the wireless access point 105-1 forwards the supplemental data indicating the authentication option and vendor to the server resource 1140. In a similar manner as previously discussed, the gateway resource 140 then enforces redirecting the communication device 120-1 to the appropriate authentication server 195-1 or 195-2 to authenticate the communication device 120-1 using the specified authentication option.

Figure 11:
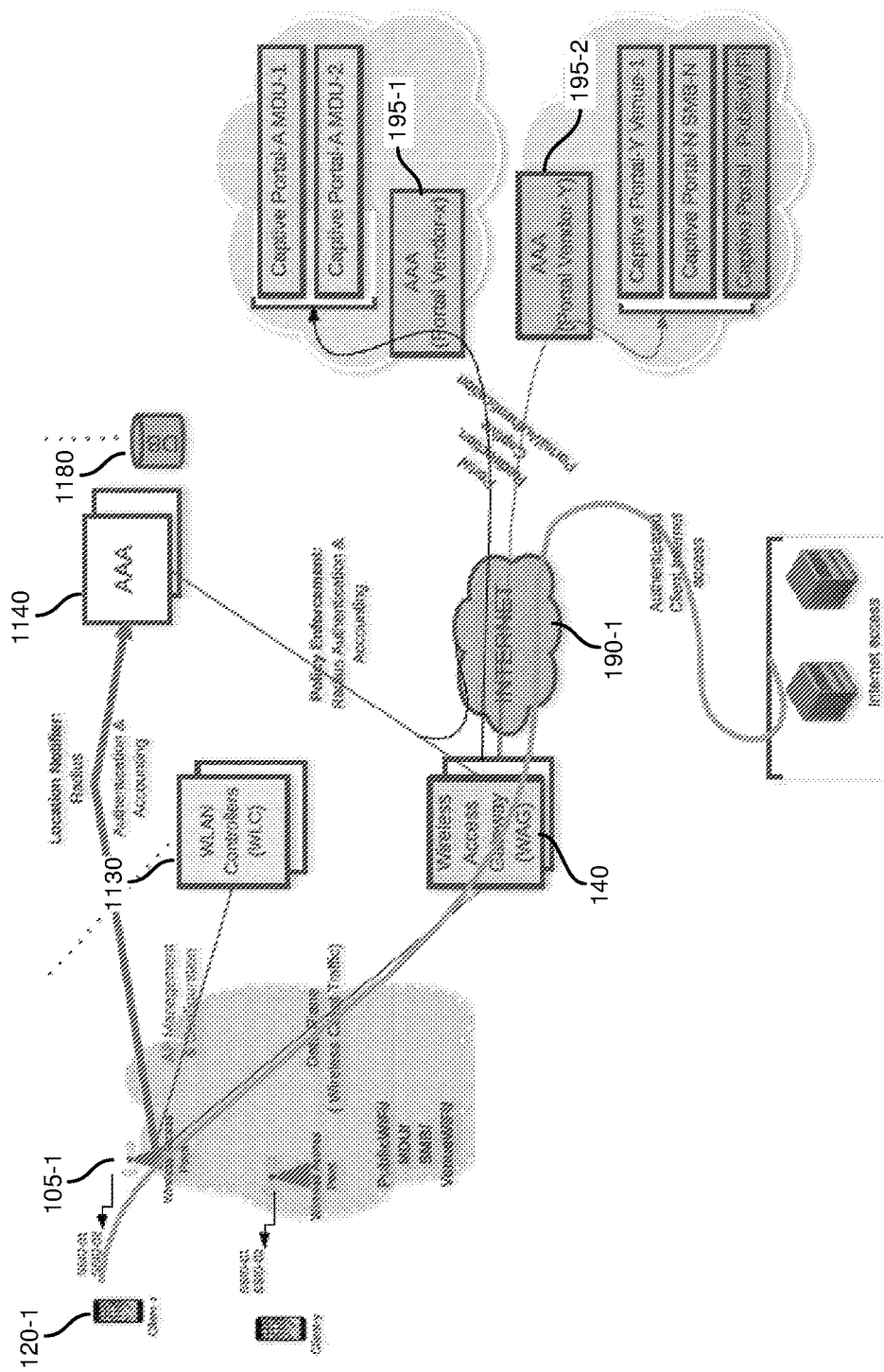
FIG. 11 is an example diagram illustrating use of location information to select one of multiple vendor portals in which to perform authentication according to embodiments herein.

FIG. 11 is an example diagram illustrating use of location information to select one of multiple vendor portals in which to perform authentication according to embodiments herein.

In this example embodiment, the wireless access point 105-1 acts as an anchor Radius proxy to the authentication server 1140.

Assume in this example, the operator of the communication device 120-1 establishes (or attempts to establish) a respective wireless communication link with the wireless access point 105-1. In one embodiment, the wireless access point 105-1 receives location information indicating a location of the respective communication device 120-1. The manner in which the wireless access point 105-1 determines a location of the wireless communication device 120-1 can occur in any suitable manner. For example, the client device 120-1 may be configured to forward GPS latitude and longitude information to the wireless access point; the location of the client device 120-1 may be known based upon a known location of the wireless access point 105-1; etc.

As further discussed herein, any of the resources in the network environment 1100 such as wireless access point 105-1, wireless LAN controller 1130, authentication server 1140, wireless access gateway 140, authentication server 195-1, authentication server 195-2, etc., can be used to select a particular vendor and or captive portal to perform authentication of the respective communication device 120-1.

Figure 13:
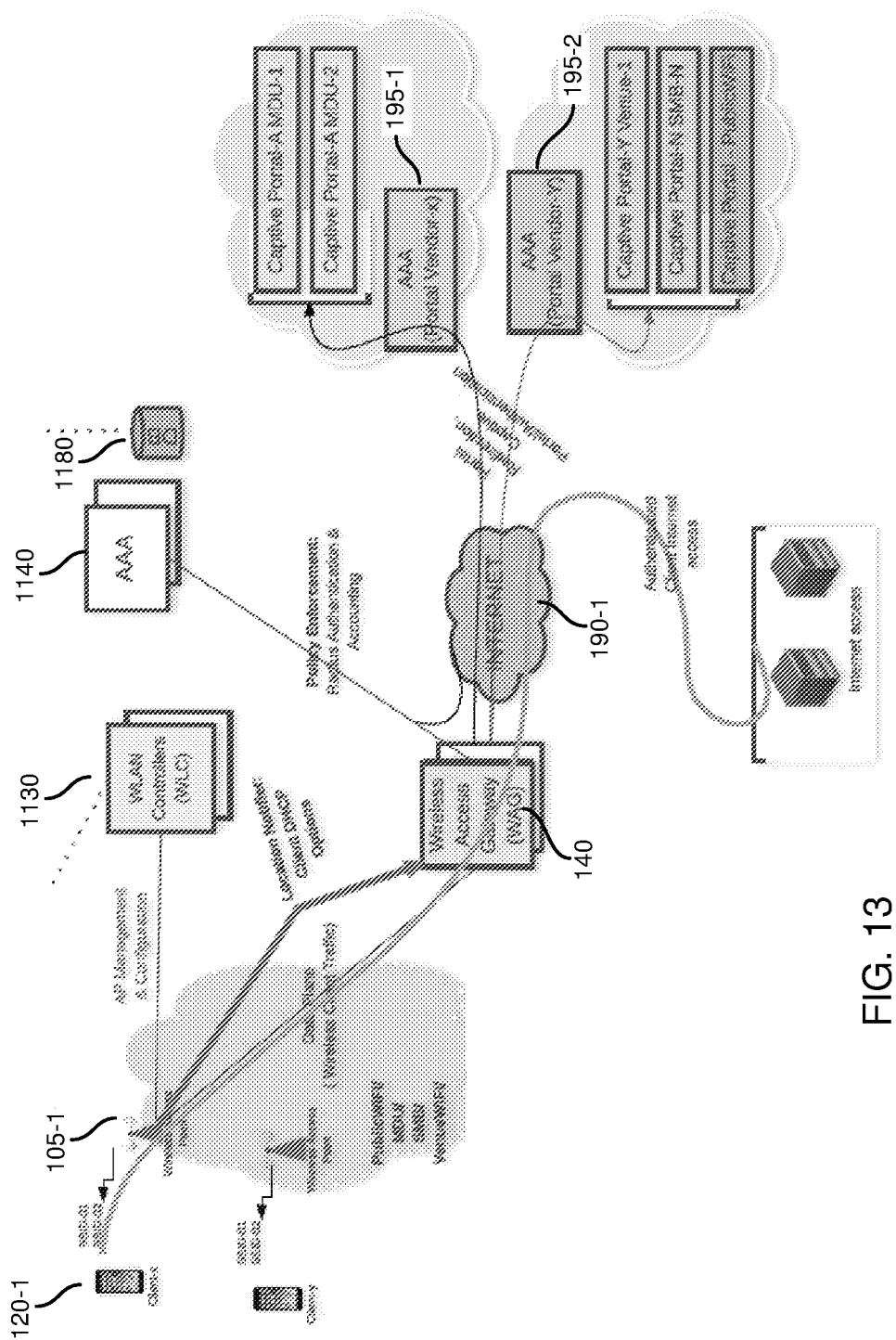
FIG. 13 is an example diagram illustrating use of location information to select one of multiple vendor portals in which to perform authentication according to embodiments herein.

In one embodiment, subsequent to receiving the location information, wireless access point 105-1 forwards the location information associated with the communication device 120-1 (such as GPS information, unique identifier value assigned to the wireless access point 105-1, etc.) to the authentication server 1140 via a suitable protocol such as the Radius protocol as shown in FIG. 13. Accordingly, the authentication server 1140 receives notification of the location of the communication device 120-1. The authentication server 140 stores the location information in repository 1180.

In one embodiment, the wireless access gateway 140 performs a selection of which of the different captive portals is to be used to authenticate the communication device 120-1 based upon location information received from the authentication server 1140 or other suitable resource.

For example, when a client session is initiated, the wireless gateway 140 can be configured to perform a respective authentication transaction with the authentication server 1140. During the authentication transaction, the authentication server 1140 fetches a client's location identifier (i.e., any suitable information indicating a current location of the communication device 120-1) and injects the notification of the communication device 120-1 and corresponding current location in respective Radius transactions to the wireless gateway 140. The wireless access gateway 140 stores the location information in a corresponding client session context associated with the communication device 120-1.

In furtherance of this embodiment, the wireless gateway 140 makes a selection of an appropriate captive portal to be used to authenticate the communication device 120-1 based upon the location information. In one embodiment, the gateway resource 140 includes map information mapping each of multiple different location information to a respective vendor and captive portal. In furtherance of performing authentication, the wireless access gateway 140 can be configured to enforce the selection by redirecting communications from the communication device 120-1 to the appropriate selected captive portal (such as one of authentication server 195-1, authentication server 195-2, etc.) to perform authentication. In a similar manner as previously discussed, redirection of the communication device 120-1 to the selected captive portal enables the communication device 120-1 (and/or user) to provide appropriate authentication credentials to use a respective wireless communication link to access a remote network such as the Internet.

In accordance with yet further embodiments, note that the authentication server 1140 and/or gateway resource 140 can be configured to include the client location information in required transactions with the portal vendor. More specifically, in yet further embodiments, the wireless gateway 140 can be configured to forward the respective received location information associated with the communication device 120-1 (as received from authentication server 1140) to one or more vendor servers such as server resource 195-1, server resource 195-2, etc. If desired, the vendor server then uses the location information to select which of the multiple available captive portals is to be used to authenticate the respective communication device 120-1.

In accordance with still further embodiments, in a manner as previously discussed, note again that the wireless access point 105-1 can be configured to identify (such as based on SSID of the wireless access point, location of the communication device 120-1, known location of the wireless access point 105-1, attributes of the user and/or communication device, etc.) which of multiple authentication options available from multiple different vendors that will be used to authenticate the communication device 120-1. Instead of forwarding location information, the wireless access point 105-1 forwards the supplemental data indicating the authentication option and vendor to the server resource 1140. In a similar manner as previously discussed, the gateway resource 140 then enforces redirecting the communication device 120-1 to the appropriate authentication server 195-1 or 195-2 to authenticate the communication device 120-1 using the specified authentication option.

Figure 12:
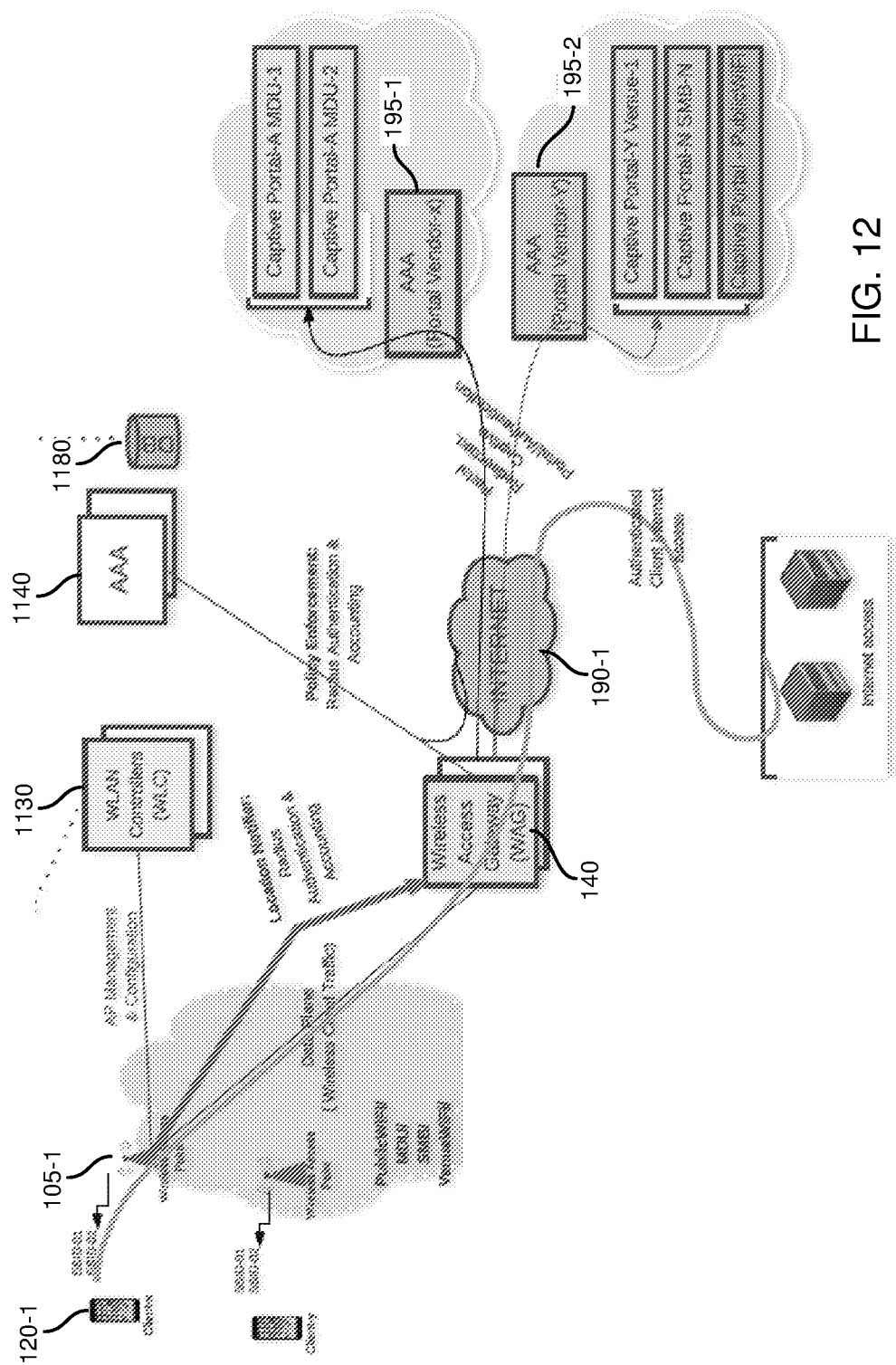
FIG. 12 is an example diagram illustrating use of location information to select one of multiple vendor portals in which to perform authentication according to embodiments herein.

FIG. 12 is an example diagram illustrating use of location information to select one of multiple vendor portals in which to perform authentication according to embodiments herein.

In this example embodiment, the wireless access point 105-1 acts as a Radius client to the wireless gateway 140.

Assume in this example that the operator of the communication device 120-1 establishes (or attempts to establish) a respective wireless communication link with the wireless access point 105-1. In one embodiment, the wireless access point 105-1 receives location information indicating a location of the respective communication device 120-1. The manner in which the wireless access point 105-1 determines a location of the wireless communication device 120-1 can occur in any suitable manner. For example, the client device may be configured to forward GPS latitude and longitude information to the wireless access point; the location of the client device 120-1 may be known based upon a known location of the wireless access point 105-1; etc.

As further discussed herein, any of the resources in the network environment 1100 such as wireless access point 105-1, wireless LAN controller 1130, authentication server 1140, wireless access gateway 140, authentication server 195-1, authentication server 195-2, etc., can be used to select a particular vendor and or captive portal to perform authentication of the respective communication device 120-1.

In one embodiment, subsequent to receiving the location information (such as based on an SSID of the wireless access point 105-1), wireless access point 105-1 forwards the location information associated with the communication device 120-1 (such as GPS information, unique identifier value such as SSID assigned to the wireless access point 105-1, etc.) to the gateway resource 140. Accordingly, the gateway resource 140 receives notification of the location of the communication device 120-1. The authentication server 140 stores the location information in the context associated with the communication session established for the communication device 120-1.

In one embodiment, the wireless access gateway 140 performs a selection of which of the different captive portals is to be used to authenticate the communication device 120-1 based upon location information received from the authentication server 1140 or other suitable resource such as wireless access point 105-1 as previously discussed.

For example, when a client session is initiated, the wireless gateway 140 can be configured to perform a respective authentication transaction with the authentication server 1140. During the authentication transaction, the authentication server 1140 potentially fetches a client's location identifier (i.e., any suitable information indicating a current location of the communication device 120-1) and injects the notification of the communication device 120-1 and corresponding current location in respective Radius transactions to the wireless gateway 140. Alternatively, the wireless gateway resource 140 is aware of the location information associated with communication device 120-1 based on location information received from wireless access point 105-1 as previously discussed. The wireless access gateway 140 stores the location information in a corresponding client session context associated with the communication device 120-1.

In furtherance of this embodiment, the wireless gateway 140 makes a selection of an appropriate captive portal to be used to authenticate the communication device 120-1 based upon the location information. In one embodiment, the gateway resource 140 includes map information mapping each of multiple different location information to a respective vendor and captive portal. In furtherance of performing authentication, the wireless access gateway 140 can be configured to enforce the selection by redirecting communications from the communication device 120-1 to the appropriate selected captive portal (such as one of authentication server 195-1, authentication server 195-2, etc.) to perform authentication. In a similar manner as previously discussed, redirection of the communication device 120-1 to the selected captive portal enables the communication device 120-1 (and/or user) to provide appropriate authentication credentials to use a respective wireless communication link to access a remote network such as the Internet.

In accordance with yet further embodiments, note that the authentication server 1140 and/or gateway resource 140 can be configured to include the client location information in required transactions with the portal vendor. More specifically, in yet further embodiments, the wireless gateway 140 can be configured to forward the respective received location information associated with the communication device 120-1 (as received from authentication server 1140) to one or more vendor servers such as server resource 195-1, server resource 195-2, etc. If desired, the vendor server then uses the location information to select which of the multiple available captive portals is to be used to authenticate the respective communication device 120-1.

In accordance with still further embodiments, in a manner as previously discussed, note again that the wireless access point 105-1 can be configured to identify (such as based on SSID of the wireless access point, location of the communication device 120-1, known location of the wireless access point 105-1, attributes of the user and/or communication device, etc.) which of multiple authentication options available from multiple different vendors that will be used to authenticate the communication device 120-1. Instead of forwarding location information, the wireless access point 105-1 forwards the supplemental data indicating the authentication option and vendor to the server resource 1140. In a similar manner as previously discussed, the gateway resource 140 then enforces redirecting the communication device 120-1 to the appropriate authentication server 195-1 or 195-2 to authenticate the communication device 120-1 using the specified authentication option.

FIG. 13 is an example diagram illustrating use of location information to select one of multiple vendor portals in which to perform authentication according to embodiments herein.

In this example embodiment, the wireless gateway resource 140 receives notification of the location of the client device based upon client DHCP options. For example, the wireless access point 105-1 inserts the location information or identifier in the client DHCP transactions to the wireless gateway resource 140.

Assume in this example, the operator of the communication device 120-1 establishes (or attempts to establish) a respective wireless communication link with the wireless access point 105-1. In one embodiment, the wireless access point 105-1 receives location information indicating a location of the respective communication device 120-1. The manner in which the wireless access point 105-1 determines a location of the wireless communication device 120-1 can occur in any suitable manner. For example, the client device may be configured to forward GPS latitude and longitude information to the wireless access point; the location of the client device 120-1 may be known based upon a known location of the wireless access point 105-1; etc.

As further discussed herein, any of the resources in the network environment 1100 such as wireless access point 105-1, wireless LAN controller 1130, authentication server 1140, wireless access gateway 140, authentication server 195-1, authentication server 195-2, etc., can be used to select a particular vendor and or captive portal to perform authentication of the respective communication device 120-1.

In one embodiment, subsequent to receiving the location information, wireless access point 105-1 forwards the location information associated with the communication device 120-1 (such as GPS information, unique identifier value assigned to the wireless access point 105-1, etc.) to the gateway resource 140 in DHCP communications. Accordingly, the gateway resource 140 receives notification of the location of the communication device 120-1. The authentication server 1140 stores the location information in the context associated with the communication session established for the communication device 120-1. In a similar manner as previously discussed, redirection of the communication device 120-1 to the selected captive portal enables the communication device 120-1 (and/or user) to provide appropriate authentication credentials to use a respective wireless communication link to access a remote network such as the Internet.

The wireless gateway resource 140 includes the client location information in radius interactions with the authentication server 1140. As previously discussed, the authentication server 1140 can be configured to make selection of a corresponding portal to be used by the communication device 120-1 to perform authentication. Alternatively, the wireless gateway resource 140 can be configured to select a respective captive portal that is to be used to perform authentication of the communication device 120-1. In yet further alternative embodiments, the location information associated with the communication device can be forwarded to the respective vendor authentication servers that determine which captive portals to be used to affect authenticate the corresponding communication device.

In accordance with still further embodiments, in a manner as previously discussed, note again that the wireless access point 105-1 can be configured to identify (such as based on SSID of the wireless access point, location of the communication device 120-1, known location of the wireless access point 105-1, attributes of the user and/or communication device, etc.) which of multiple authentication options available from multiple different vendors that will be used to authenticate the communication device 120-1. Instead of forwarding location information, the wireless access point 105-1 forwards the supplemental data indicating the authentication option and vendor to the server resource 1140. In a similar manner as previously discussed, the gateway resource 140 then enforces redirecting the communication device 120-1 to the appropriate authentication server 195-1 or 195-2 to authenticate the communication device 120-1 using the specified authentication option.

Figure 14:
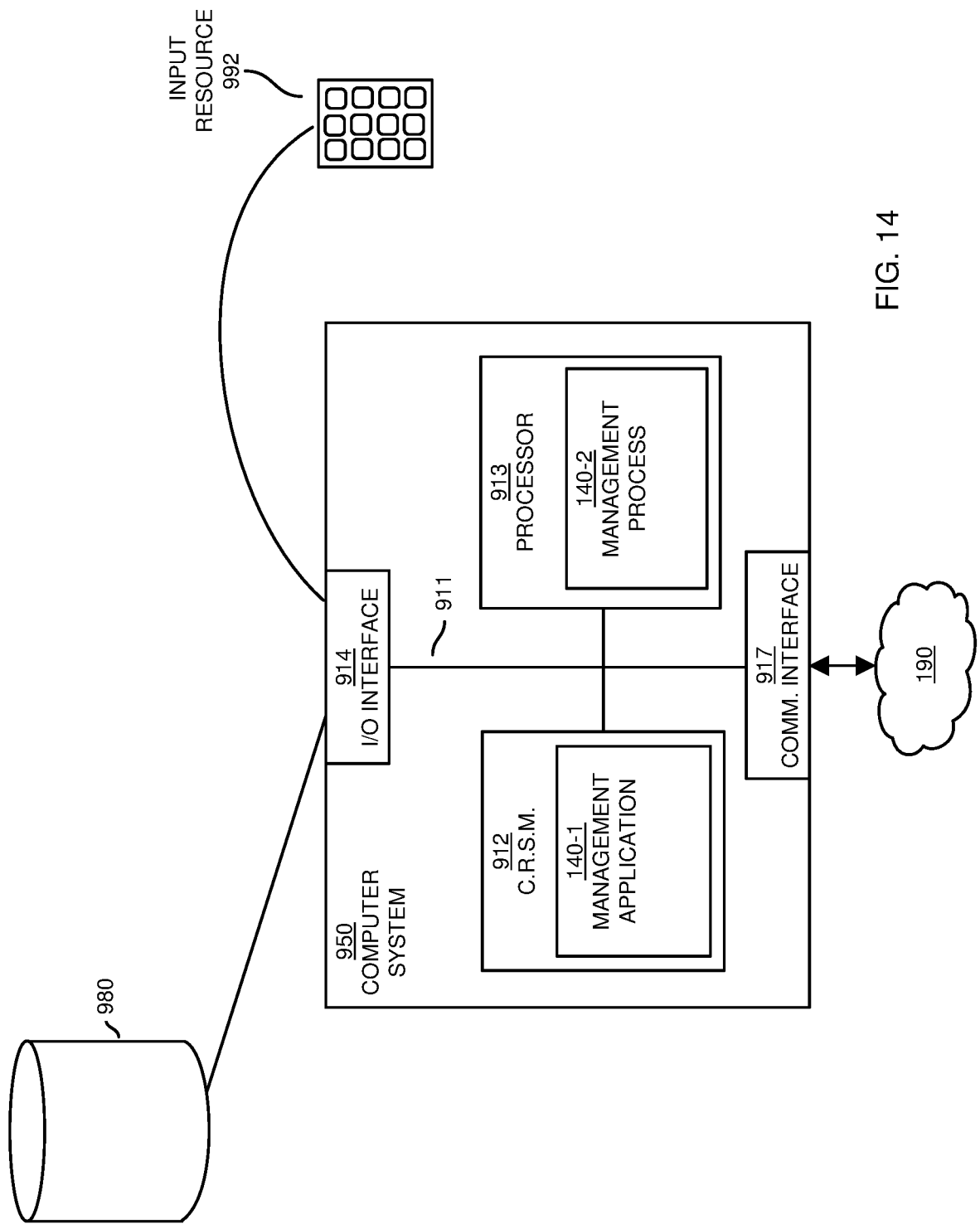
FIG. 14 is a diagram illustrating an example computer architecture to execute operations according to embodiments herein.

FIG. 14 is an example block diagram of a computer system (hardware and respective executed software) for implementing any of the operations as discussed herein according to embodiments herein.

Any of the resources as discussed herein can be configured to include a processor and executable instructions to carry out the different operations as discussed herein.

As shown, computer system 950 (such as a wireless access gateway or any other resource as discussed herein) of the present example can include an interconnect 911 that couples computer readable storage media 912 such as a non-transitory type of media (i.e., any type of hardware storage medium) in which digital information can be stored and retrieved, a processor 913, I/O interface 914, and a communications interface 917.

I/O interface 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with gateway application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in gateway application 140-1 stored on computer readable storage medium 912. Execution of the gateway application 140-1 produces gateway process 140-2 to carry out any of the operations and/or processes as discussed herein.

Those skilled in the art will understand that the computer system 950 can include other processes and/or software and hardware components, such as an operating system that controls allocation and use of hardware resources to gateway application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1050 may reside at any location or can be included in any suitable resource in any network environment to implement functionality as discussed herein.

Functionality supported by the different resources will now be discussed via flowcharts in FIG. 15. Note that the steps in the flowcharts below can be executed in any suitable order.

Figure 15:
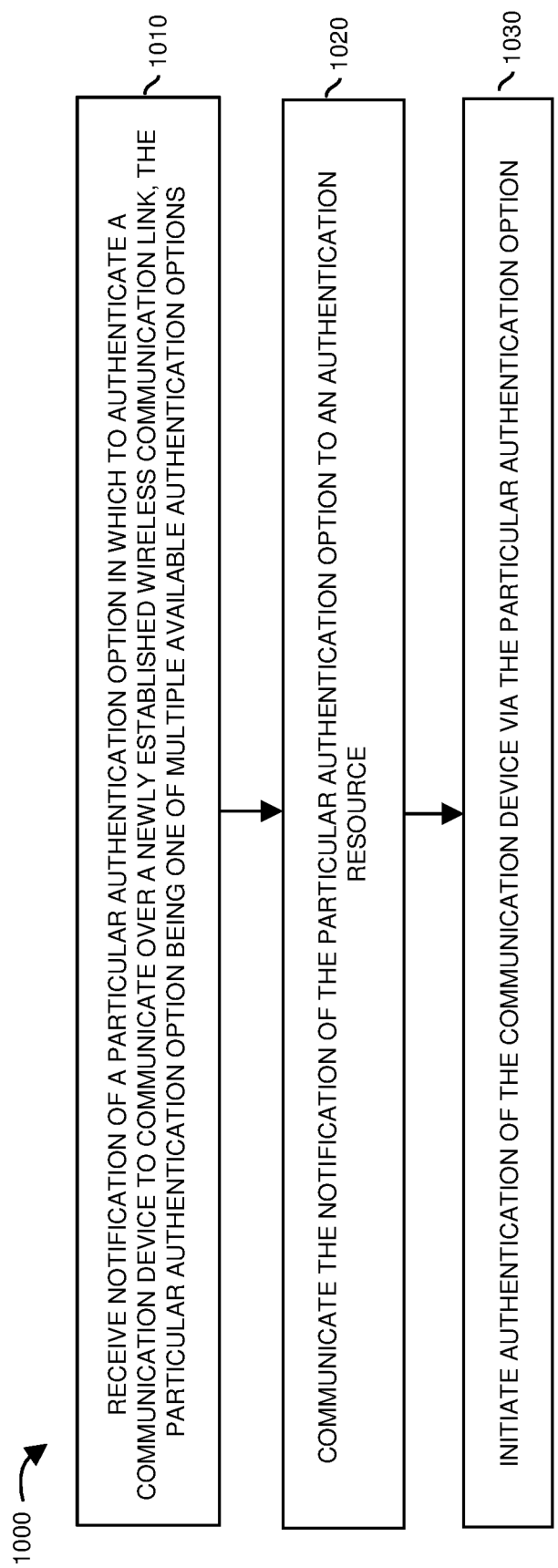
FIG. 15 is an example diagram illustrating methods according to embodiments herein.

FIG. 15 is a flowchart 1000 illustrating an example method according to embodiments herein. Note that there will be some overlap with respect to concepts as discussed above.

In processing operation 1010, the wireless access gateway 140 receives notification (such as supplemental data V1, AO3) of a particular authentication option V1AO3 in which to authenticate a communication device 120-1 to communicate over a newly established wireless communication link 128-1; the particular authentication option V1AO3 is one of multiple available authentication options.

In processing operation 1020, the wireless access gateway 140 communicates the notification (supplemental data V1, AO3) of the particular authentication option to an authentication resource 155. The authentication resource 155 provides the wireless access gateway 140 network address information (such as URL 13) indicating a server resource 195-1 from which to redirect the communication device 120-1 to a captive portal (web page 13) provided by vendor V1.

In processing operation 1030, the wireless access gateway 140 initiates authentication of the communication device 120-1 via the particular authentication option. As previously discussed, this can include the wireless access gateway 140 using the network address information to retrieve web page 13 and communicate it through the wireless access point 105-1 to the communication device 120-1. The communication device 120-1 displays the webpage WP13 on the display screen 130. Via the webpage WP13, the user 108-1 supplies appropriate information to authenticate the user 108-1 and corresponding communication device 120-1 for subsequent wireless access to a network such as the Internet.

Note again that techniques herein are well suited to provide flexible assignment and implementation of wireless authentication options in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    via a first wireless access point:
        receiving first input from a first communication device, the first input including a first request for retrieval of first content;
        determining a first authentication option assigned to the first wireless access point, the first authentication option supported by a first vendor;
        transmitting a communication to a gateway resource to authenticate the first communication device, the communication specifying the first authentication option assigned to the first wireless access point; and
        in response to the first input, communicating notification of a first authentication server to the first communication device, the first authentication server providing a first authentication service associated with the first vendor, the first authentication server determined via mapping of the first authentication option to the first authentication server.

2. The method as in claim 1 further comprising:
    producing the communication to include an identity of the first content specified by the first request; and
    in response to transmitting the communication to the gateway resource, receiving a redirect message generated by an authentication management resource, the redirect message including an identity of the first authentication server in which to authenticate the first communication device to retrieve the first content.

3. The method as in claim 2 further comprising:
    communicating the redirect message to the first communication device.

4. The method as in claim 3 further comprising:
    in response to communicating the redirect message to the first communication device: i) receiving second input from the first communication device, the second input including credentials associated with the first communication device, and ii) forwarding the credentials through the gateway resource to the first authentication server as specified by the redirect message.

5. The method as in claim 4 further comprising:
    at the first wireless access point: i) receiving notification from the first authentication server, the notification received from the first authentication server indicating successful authentication of the first communication device based on the credentials, and ii) communicating the notification received from the first authentication server to the first communication device.

6. The method as in claim 1, wherein the first authentication option specifies the first vendor assigned to provide authentication services to the first wireless access point.

7. The method as in claim 6, wherein the first authentication option specifies one of multiple different authentication options associated with the first vendor.

8. The method as in claim 1, wherein the communication is a first communication, the method further comprising:
    via a second wireless access point:
        receiving second input including a second request for retrieval of second content;
        determining a second authentication option assigned to the second wireless access point; and
        transmitting a second communication to the gateway resource to authenticate the second communication device, the second communication specifying the second authentication option assigned to the second wireless access point.

9. The method as in claim 8, wherein the first authentication option and the second authentication option are the supported by the first vendor, the first vendor being a first authentication vendor of multiple authentication vendors providing authentication management services.

10. The method as in claim 1, wherein the first wireless access point is assigned a first vendor identity value indicating an identity of the first vendor, the first vendor providing authentication services to authenticate the first communication device to use wireless access services provided by the first wireless access point.

11. The method as in claim 10 further comprising:
producing the communication to include the first vendor identity value.

12. The method as in claim 11 further comprising:
in response to transmitting the communication, at the first wireless access point, receiving a response from an authentication management resource operated by the first vendor, the response indicating an identity of the first an authentication server.

13. The method as in claim 12 further comprising:
in response to communicating the notification to the first communication device: i) receiving second input from the first communication device, the second input including credentials associated with the first communication device, and ii) forwarding the credentials through the gateway resource to the first authentication server.

14. The method as in claim 13 further comprising:
in response to forwarding the credentials through the gateway resource to the first authentication server, via the first wireless access point: i) receiving webpage information supporting authentication of the first communication device, and ii) communicating the received webpage information to the first communication device.

15. The method as in claim 1 further comprising:
producing the communication to include an indication of the first request for retrieval of the first content.

16. The method as in claim 1 further comprising:
in response to transmitting the communication to the gateway resource, receiving the notification of the first authentication server in which to authenticate the first communication device.

17. The method as in claim 16, wherein the first authentication server is determined via mapping of a combination of the first authentication option assigned to the first wireless access point and an identity of the first vendor, the first vendor providing authentication services via the first authentication server.

18. The method as in claim 1, wherein the first authentication option indicates the first vendor, the first vendor providing authentication services assigned to provide authentication services to the first wireless access point, the first vendor selected amongst multiple available vendors.

19. The method as in claim 1, wherein the first authentication option indicates: i) the first vendor, the first vendor providing authentication services associated with use of the first wireless access point, and ii) one of multiple authentication service options available from the first authentication vendor.

20. A system comprising:
a first wireless access point operative to:
receive first input from a first communication device, the first input including a first request for retrieval of first content;
determine a first authentication option assigned to the first wireless access point, the first authentication option supported by a first vendor;
transmit a communication to a gateway resource to authenticate the first communication device, the communication specifying the first authentication option assigned to the first wireless access point; and
in response to the first input, communicate notification of a first authentication server to the first communication device, the first authentication server providing a first authentication service associated with the first vendor, the first authentication server determined via mapping of the first authentication option to the first authentication server.

21. The system as in claim 20, wherein the first authentication option is selected from multiple authentication options.

22. The system as in claim 20, wherein the first wireless access point is further operative to:
produce the communication to include an identity of the first content specified by the first request; and
in response to transmitting the communication to the gateway resource, receive a redirect message generated by an authentication management resource, the redirect message including an identity of the first authentication server in which to authenticate the first communication device to retrieve the first content.

23. The system as in claim 22, wherein the first wireless access point is further operative to:
communicate the redirect message to the first communication device.

24. The system as in claim 23, wherein the first wireless access point is further operative to:
in response to communicating the redirect message to the first communication device: i) receive second input from the first communication device, the second input including credentials associated with the first communication device, and ii) forward the credentials through the gateway resource to the first authentication server as specified by the redirect message.

25. The system as in claim 24, wherein the first wireless access point is further operative to:
at the first wireless access point: i) receive notification from the first authentication server, the notification received from the first authentication server indicating successful authentication of the first communication device based on the credentials, and ii) communicate the notification received from the first authentication server to the first communication device.

26. The system as in claim 20, wherein the first authentication option specifies the first vendor assigned to provide authentication services to the first wireless access point.

27. The system as in claim 26, wherein the first authentication option specifies one of multiple different authentication options associated with the first vendor.

28. The system as in claim 20, wherein the communication is a first communication, the system further comprising:
a second wireless access point operative to:
receive second input including a second request for retrieval of second content;
determine a second authentication option assigned to the second wireless access point; and
transmit a second communication to the gateway resource to authenticate the second communication device, the second communication specifying the second authentication option assigned to the second wireless access point.

29. Computer-readable storage hardware having instructions stored thereon, the instructions, when executed by computer processor hardware, cause the computer processor hardware to:

receive first input from a first communication device, the first input including a first request for retrieval of first content;

determine a first authentication option assigned to the first wireless access point, the first authentication option supported by a first vendor;

transmit a communication to a gateway resource to authenticate the first communication device, the communication specifying the first authentication option assigned to the first wireless access point; and in response to the first input, communicate notification of a first authentication server to the first communication device, the first authentication server providing a first authentication service associated with the first vendor, the first authentication server determined via mapping of the first authentication option to the first authentication server.

* * * * *

UNITED STATES PATENT AND TRADEMARK OFFICE
CERTIFICATE OF CORRECTION

| | | |
|---|---|---|
| PATENT NO. | : 12,348,502 B2 | Page 1 of 1 |
| APPLICATION NO. | : 18/124244 | |
| DATED | : July 1, 2025 | |
| INVENTOR(S) | : Shane B. Newberg et al. | |

It is certified that error appears in the above-identified patent and that said Letters Patent is hereby corrected as shown below:

In the Claims

Column 31, Line 5 Claim 9, replace "are the" with --are--

Column 31, Line 24 Claim 12, replace "first an" with --first--

Signed and Sealed this
Twenty-third Day of September, 2025

John A. Squires
*Director of the United States Patent and Trademark Office*